United States Patent
Ghanta

(10) Patent No.: US 11,041,046 B2
(45) Date of Patent: Jun. 22, 2021

(54) METHOD FOR POLY(PHENYLENE ETHER) MANUFACTURE AND ASSOCIATED POLY(PHENYLENE ETHER)

(71) Applicant: SABIC GLOBAL TECHNOLOGIES B.V., Bergen Op Zoom (NL)

(72) Inventor: Madhav Ghanta, Delmar, NY (US)

(73) Assignee: SHPP GLOBAL TECHNOLOGIES B.V., Bergen op Zoom (NL)

(*) Notice: Subject to any disclaimer, the term of this patent is extended or adjusted under 35 U.S.C. 154(b) by 186 days.

(21) Appl. No.: 15/578,116

(22) PCT Filed: Jun. 7, 2016

(86) PCT No.: PCT/US2016/036187
§ 371 (c)(1),
(2) Date: Nov. 29, 2017

(87) PCT Pub. No.: WO2016/200791
PCT Pub. Date: Dec. 15, 2016

(65) Prior Publication Data
US 2018/0079863 A1 Mar. 22, 2018

Related U.S. Application Data

(60) Provisional application No. 62/172,868, filed on Jun. 9, 2015.

(51) Int. Cl.
*C08G 65/44* (2006.01)
(52) U.S. Cl.
CPC ......... *C08G 65/44* (2013.01); *C08G 2650/50* (2013.01); *C08G 2650/64* (2013.01)
(58) Field of Classification Search
CPC .................................................... C08G 65/44
(Continued)

(56) References Cited

U.S. PATENT DOCUMENTS 4,696,996 A * 9/1987 Brandt et al. ................. 528/214
5,880,221 A    3/1999 Liska et al.
(Continued)

FOREIGN PATENT DOCUMENTS

JP    2007217657 A    8/2007

OTHER PUBLICATIONS

Andis "A New Method for Synthesis of Poly (2,6-dimethyl-1,4-phenylene oxide) and Poly (2,6-diphenyl-1,4-phenyl oxide"; J. of Chem.; 2013; Article ID 856928; pp. 1-4; http://dx.doi.org/10.1155/2013/856928.

(Continued)

*Primary Examiner* — Shane Fang
(74) *Attorney, Agent, or Firm* — Cantor Colburn LLP

(57) ABSTRACT

A method of making a poly(phenylene ether) comprises: in an exotherm period, continuous addition of oxygen and a monohydric phenol to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.5:1 to 1.2:1; and cessation of the continuous addition of the monohydric phenol; and in a build period, continuation of oxygen addition until there is no further increase in viscosity of the polymerization mixture. A poly(phenylene ether) having an intrinsic viscosity of 0.5 to 2.0 deciliters per gram, measured in chloroform using an Ubbelohde capillary glass viscometer at 25° C., a polydispersity of 1 to 10, and a unimodal molecular weight distribution, is made by the method.

20 Claims, 9 Drawing Sheets

(58) Field of Classification Search
USPC .......................................................... 528/212
See application file for complete search history.

(56) References Cited

U.S. PATENT DOCUMENTS

| | | | |
|---|---|---|---|
| 6,323,300 | B1 | 11/2001 | Kita et al. |
| 6,472,499 | B1 | 10/2002 | Braat et al. |
| 6,586,567 | B2 | 7/2003 | Takeda et al. |
| 7,282,554 | B2 | 10/2007 | Mitsui et al. |
| 2009/0211967 | A1 | 8/2009 | Delsman et al. |
| 2009/0306273 | A1 | 12/2009 | Sokolowski |
| 2012/0329961 | A1 | 12/2012 | Carrillo et al. |

OTHER PUBLICATIONS

Cooper et al "Block Copolymers by Oxidative Couping of Phenols"; Macromol; 1970; vol. 3(1); pp. 101-102.

Cooper et al "Mechanism of Oxidative Polymerization of 2,6-Disubstituted Phenols. Structure of Polymers from Mixed Dimers of 2,6-Dimethylphenol and 2,6-Dephenylphenol"; J. Org. Chem.; 1972; vol. 34; No. 3; pp. 441-447.

Fukuhara et al "Synthesis of thermosetting poly(phenylene ether) containing allyl groups"; Polymer; 2004; 45; pp. 843-847.

Hay "Poly(phenylene oxide)s and poly(arylene ether)s derived from 2,6-diarylphenols"; Prog. Polym. Sci.; 1999; 24; pp. 45-80

Hay "Polymerization by Oxidative Coupling. VI. Oxidation of o-Cresol"; Polymer Letter; 1965; vol. 3; pp. 887-889.

Hay "Poly(2,6-diphenyl-1,4-phenylene oxide)"; Macromol; 1969; vol. 2; No. 1; pp. 107-108.

Hay "Polymerization by Oxidative Coupling. II. Oxidation of 2,6-Disubstituted Phenols"; Journal of Polymer Science; 1962; vol. 58; pp. 581-591.

Hay "The Remarkable Effect of Fluorine Substitutents on the Properties of Poly (2,6-diphenyl-1,4-phenylene ether) and Poly (aryl ether) s"; J. of Poly. Sci. Part A: Polymer Chemistry; 1993; vol. 31; pp. 1907-1909.

Hay et al "Poly (2,6-diaryl-1,4-phenylene oxides)"; Macromol; 1970; vol. 3; No. 5; pp. 533-535.

Higashimura et al "'Radical-controlled' oxidative polymerization of o-cresol catalyzed by u-n2:n2-peroxo dicopper(II) complex"; Applied Catalysis A: General 194-195; 2000; pp. 427-433.

Ikeda et al "A new crosslinable polyphenol from a renewable resource"; Macromol. Rapid Commun.; 2000; 21; pp. 496-499.

International Search Report for International Application No. PCT/US2016/036187; International Filing Date Jun. 7, 2016; dated Sep. 13, 2016; 5 pages.

Machine Translation for JP2007217657.

Nunoshige et al "Efficient Oxidative Coupling Polymerization for Synthesis of Thermosetting Poly(phenylene ether) Copolymer with a Low Dielectric Loss"; J. of Poly. Sci, Part A. Poly. Chem.; 2008; vol. 46; pp. 5278-5282.

Ramya et al "Poly(phenylene oxide)—Based Polymer Electrolyte Membranes for Fuel-Cell Applications"; J. of Applied Poly. Sci.; 2003; vol. 88; pp. 307-311.

Shibasaki et al "Oxidative Coupling Polymerization of Substituted Phenols with a Copper Amine Catalyst Immobilized within Mesoporous Silica"; Macromol. Symp.; 2006; 245-246; pp. 87-92.

Vishnupriya et al "Synthesis and Characterization of Sulfonated Poly (phenylene oxide as Membrane Fuel Cells"; J. of Applied Poly. Sci.; 2002; vol. 83; pp. 1792-1798.

White et al "Polymerization by Oxidating Coupling. IV. Synthesis and Properties of Poly(2-methyl-6-phenylphenylene Ether)"; Journal of Polymer Science: Part A1; 1972; vol. 10; pp. 1565-1578.

White et al.; "Polymerization by Oxidation Coupling. I. A Study of the Oxidation of 2,6-Diphenylphenol to Poly(2,6-diphenyl-1,4-phenylene ether"; Journal of Polymer Science:Part A-1, vol. 8; 1970; 1427-1438.

White; "Polymerization by Oxidative Coupling. II. Co-Redistribution of Poly(2,6-diphenyl-1,4-phenylene Ether) when Phenols"; Journal of Polymer Science:Part A-1, vol. 9; 1971; 663-675.

White; "Reactions of Poly(phenylene Oxide)s with Quinones. I. The Quinone-Coupling Reaction Between Low-Molecular-Weight Poly(2,6-Dimethyl-1,4-Phenylene Oxide) and 3,3',5,5'-Tetramethyl-4,4'-Diphenoquinone"; General Electric Cornpany;1981;1367-1383.

Written Opinion of the International Search Report for International Application No. PCT/US2016/036187; International Filing Date Jun. 7, 2016; dated Sep. 13, 2016; 5 pages.

Yang et al "Fluorine Substitutent Effects on Poly (2,6-diphenylphenylene ether)"; J. of Poly. Sci. Part A: Polymer Chemistry; 1993; vol. 31; pp. 2015-2029.

\* cited by examiner

METHOD FOR POLY(PHENYLENE ETHER) MANUFACTURE AND ASSOCIATED POLY(PHENYLENE ETHER)

CROSS REFERENCE TO RELATED APPLICATION

This application is a National Stage application of PCT/US2016/036187, filed Jun. 7, 2015, which claims the benefit of U.S. Provisional Application No. 62/172,868, filed Jun. 9, 2015, the disclosures of which are incorporated by reference in their entirety herein.

BACKGROUND OF THE INVENTION

Poly(phenylene ether)s are a class of plastics known for excellent water resistance, dimensional stability, and inherent flame retardancy, as well as high oxygen permeability, and oxygen/nitrogen selectivity. Properties such as strength, stiffness, chemical resistance, and heat resistance can be tailored by blending poly(phenylene ether)s with various other plastics in order to meet the requirements of a wide variety of consumer products, for example, plumbing fixtures, electrical boxes, automotive parts, insulation for wire and cable, and hollow fiber membranes. Improved properties useful for certain applications can be obtained with poly(phenylene ether) copolymers.

An example of a commercial poly(phenylene ether) is poly(2,6-dimethyl-1,4-phenylene ether), which is prepared on a large scale by the oxidative polymerization of 2,6-dimethylphenol (also known as 2,6-xylenol). For certain product applications, for example hollow fiber membranes, high molecular weight poly(2,6-dimethyl-1,4-phenylene ether) is desirable. However, high molecular weight poly(2,6-dimethyl-4-phenylene ether) can have a bimodal molecular weight distribution, as indicated in the GPC trace of FIG. 1.

Without being bound by theory, the low molecular weight fraction is believed to be caused by polymer chain scission during equilibration of poly(2,6-dimethyl-1,4-phenylene ether) with 2,2',6,6'-diphenoquinone. The presence of a low molecular weight fraction results in a high polydispersity and can adversely affect the physical properties and oxidative resistance of poly(phenylene ether). For example, the low molecular weight fraction has a proportionally higher amount of phenolic terminal groups, which are prone to oxidation. Therefore it is desirable to develop an improved method for producing high molecular weight poly(phenylene ether) having a unimodal molecular weight distribution and low polydispersity. The method should be commercially-scalable, economical, and environmentally acceptable.

BRIEF DESCRIPTION OF THE INVENTION

A method of making a poly(phenylene ether) comprises: in an exotherm period, continuous addition of oxygen and a monohydric phenol of the structure:

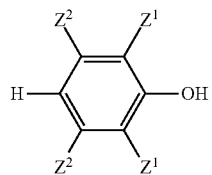

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms, to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.5:1 to 1.2:1; and cessation of the continuous addition of the monohydric phenol; and in a build period, continuation of oxygen addition until there is no further increase in viscosity of the polymerization mixture. A poly(phenylene ether) having an intrinsic viscosity of 0.5 to 2.0 deciliters per gram, measured in chloroform using an Ubbelohde capillary glass viscometer at 25° C., a polydispersity of 1 to 10, and a unimodal molecular weight distribution, is made by the method.

BRIEF DESCRIPTION OF THE DRAWINGS

Referring now to the drawings.

DETAILED DESCRIPTION OF THE INVENTION

Figure 1:
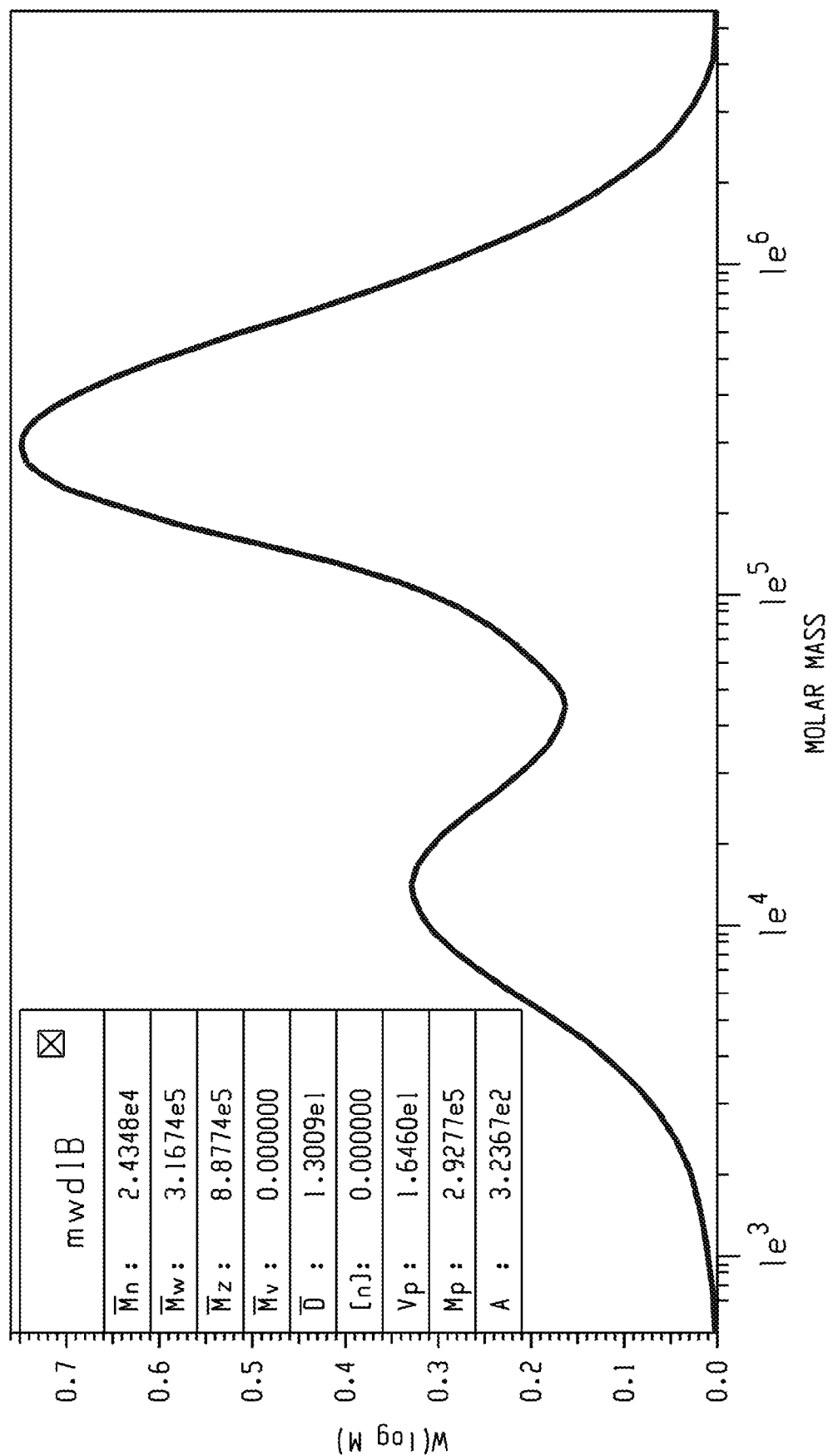
FIG. 1 depicts the gel permeation chromatography trace for a commercial sample of high molecular weight poly(2,6-dimethyl-1,4-phenylene ether).

The presence of a low molecular weight fraction in high molecular weight poly(2,6-dimethyl-4-phenylene ether) results in a high polydispersity and can adversely affect the physical properties and oxidative resistance of poly(phenylene ether). An improved method for producing high molecular weight poly(phenylene ether) having a unimodal molecular weight distribution and low polydispersity has been developed. The method is commercially-scalable, economical, and environmentally acceptable. Thus a method of making a poly(phenylene ether) having an intrinsic viscosity of 0.5 to 2.0 deciliters per gram, measured in chloroform using an Ubbelohde capillary glass viscometer at 25° C., a polydispersity of 1 to 10, and a unimodal molecular weight distribution comprises: in an exotherm period, continuous addition of oxygen and a monohydric phenol of the structure:

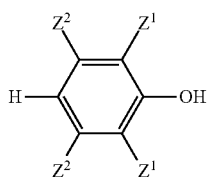

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; in the presence of a non-polar solvent and a polymerization catalyst comprising a metal salt, an amine, and a quaternary ammonium salt, wherein the oxygen and monohydric monomer are added in a mole ratio of 0.5:1 to 1.2:1; cessation of the continuous addition of the monohydric phenol; and in a build period, continuation of oxygen addition until there is no further increase in viscosity of the polymerization mixture A poly(phenylene ether) having repeat units of the structure:

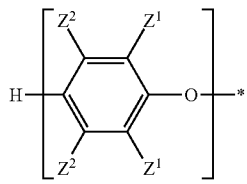

wherein $Z^1$ and $Z^2$ are as defined for the monohydric phenol, is made by the method. The poly(phenylene ether) has an intrinsic viscosity of 0.5 to 2.0 deciliters per gram, measured in chloroform using an Ubbelohde capillary glass viscometer at 25° C.; a polydispersity of 1 to 10, and a unimodal molecular weight distribution The mole ratio of oxygen to monohydric phenol is referred to herein as the "O/monomer mole ratio" for brevity. In the method, the oxygen and monohydric phenol are added in a mole ratio of 0.5:1 to 1.2:1. Within this range, the O/monomer mole ratio can be greater than or equal to 0.6:1, 0.7:1, 0.8:1, 0.9:1, 0.95:1, or 1.0:1 and less than or equal to 1.15:1, 1.10:1, or 1.05:1. The inventors have determined that intrinsic viscosity is optimized (maximized) at an O/monomer mole ratio of 0.95:1 to 1.2:1, specifically 1.0:1 to 1.2:1, more specifically 1.0:1 to 1.15:1, and still more specifically 1.0:1 to 1.1:1. Without being bound by theory, below these ratios, C—C coupling, which results in undesired oxidative dimerization of the monohydric phenol to form a diphenoquinone, can be increased relative to C—O coupling, which results in the desired oxidative polymerization. When the monohydric phenol is 2,6-dimethylphenol, the yield of 2,2', 6,6'-diphenoquinone (TMDQ) is increased, which in turn results in an intrinsic viscosity drop during equilibration. Above these ratios, incorporation of amine, for example dibutylamine, into the polymer chain increases, which interferes with polymerization. An O/monomer mole ratio of greater than or equal to 1.3:1 is also undesirable because it can result in an explosion hazard in the vessel headspace.

In some embodiments of the method and the poly(phenylene ether) made by the method, the monohydric phenol is 2,6-dimethylphenol and the poly(phenylene ether) made by the method is poly(2,6-dimethyl-4-phenylene ether). The method is also suitable for copolymerization and copolymers. Thus in some embodiments of the method and the poly(phenylene ether) made by the method, the monohydric phenol comprises a first monohydric phenol that is 2,6-dimethylphenol and a second monohydric phenol that is 2-methyl-6-phenylphenol or 2,6-diphenylphenol; and the poly(phenylene ether) made by the method is poly(2-methyl-6-phenyl-1,4-phenylene-co-2,6-dimethyl-1,4-phenylene ether) or poly(2,6-diphenyl-1,4-phenylene-co-2,6-dimethyl-1,4-phenylene ether). The poly(phenylene ether) can be a copolymer derived from 1 to 50 mole percent of the second monohydric phenol and 50 to 99 mole percent of the first monohydric phenol.

The poly(phenylene ether) made by the method has an intrinsic viscosity of 0.5 to 2.0 deciliters per gram, measured in chloroform using an Ubbelohde capillary glass viscometer at 25° C. Within this range, the intrinsic viscosity can be greater than or equal to 0.8, 0.9, 1.0, 1.2, or 1.3 deciliters per gram, and less than or equal to 1.8, 1.7, 1.6, or 1.5 deciliters per gram. In some embodiments, the intrinsic viscosity is 0.8 to 1.7 deciliters per gram, specifically 1.3 to 1.5 deciliters per gram, and more specifically 1.35 to 1.45 deciliters per gram.

In some embodiments of the method and the poly(phenylene ether) made by the method, the weight-average molecular weight of the poly(phenylene ether) made by the method is 60,000 to 500,000 daltons, as measured by gel permeation chromatography. Within this range, the weight-average molecular weight can be greater than or equal to 100,000 or 200,000 daltons, and less than or equal to 400,000 or 300,000 daltons.

The poly(phenylene ether) made by the method has a polydispersity of 1 to 10. Within this range, the polydispersity can be greater than or equal to 2 or 3, and less than or equal to 8, 7, or 6. Advantageously, the polydispersity can be less than that obtained by other methods, and less than observed in commercial high molecular weight poly(2,6-dimethyl-1,4-phenylene ether), for example PPO™ 6130. Thus in some embodiments, the polydispersity is 2 to 7, specifically 2 to 6, and more specifically 3 to 6.

Advantageously, the poly(phenylene ether) made by the method has a unimodal molecular weight distribution. High molecular weight poly(2,6-dimethyl-4-phenylene ether) can have a bimodal molecular weight distribution, as indicated in the GPC trace of FIG. 1.

Without being bound by theory, the low molecular weight fraction is believed to be caused by polymer chain scission during equilibration of poly(2,6-dimethyl-1,4-phenylene ether) with 2,2',6,6'-diphenoquinone. The presence of a low molecular weight fraction results in high polydispersity and can adversely affect the physical properties and oxidative resistance of poly(phenylene ether). Therefore the absence of a low molecular weight fraction results in a low polydispersity and a unimodal molecular weight distribution which provides improved physical properties and oxidative resistance.

In some embodiments, the method further comprises, after completion of the exotherm period and build period, an equilibration step comprising: cessation of oxygen addition; flushing oxygen from a gaseous head space above the polymerization mixture; addition of a aqueous chelating agent to the polymerization mixture; and in an equilibration period, holding the polymerization mixture for 0.1 to 24 hours at 30 to 80° C. Within these ranges, the equilibration period can be greater than or equal to 1, 2, or 3 hours, and less than or equal to 12, 6, or 5 hours; and the equilibration temperature can be greater than 40, 50, or 60° C. and less than 70° C. In some embodiments, a poly(phenylene ether) is made by the method, wherein the method further comprises, after completion of the exotherm period and build period, an equilibration step comprising: cessation of oxygen addition; flushing oxygen from a gaseous head space above the polymerization mixture; addition of a aqueous chelating agent to the polymerization mixture; and in an equilibration period, holding the polymerization mixture for 0.1 to 24 hours at 30 to 80° C.

Figure 2:
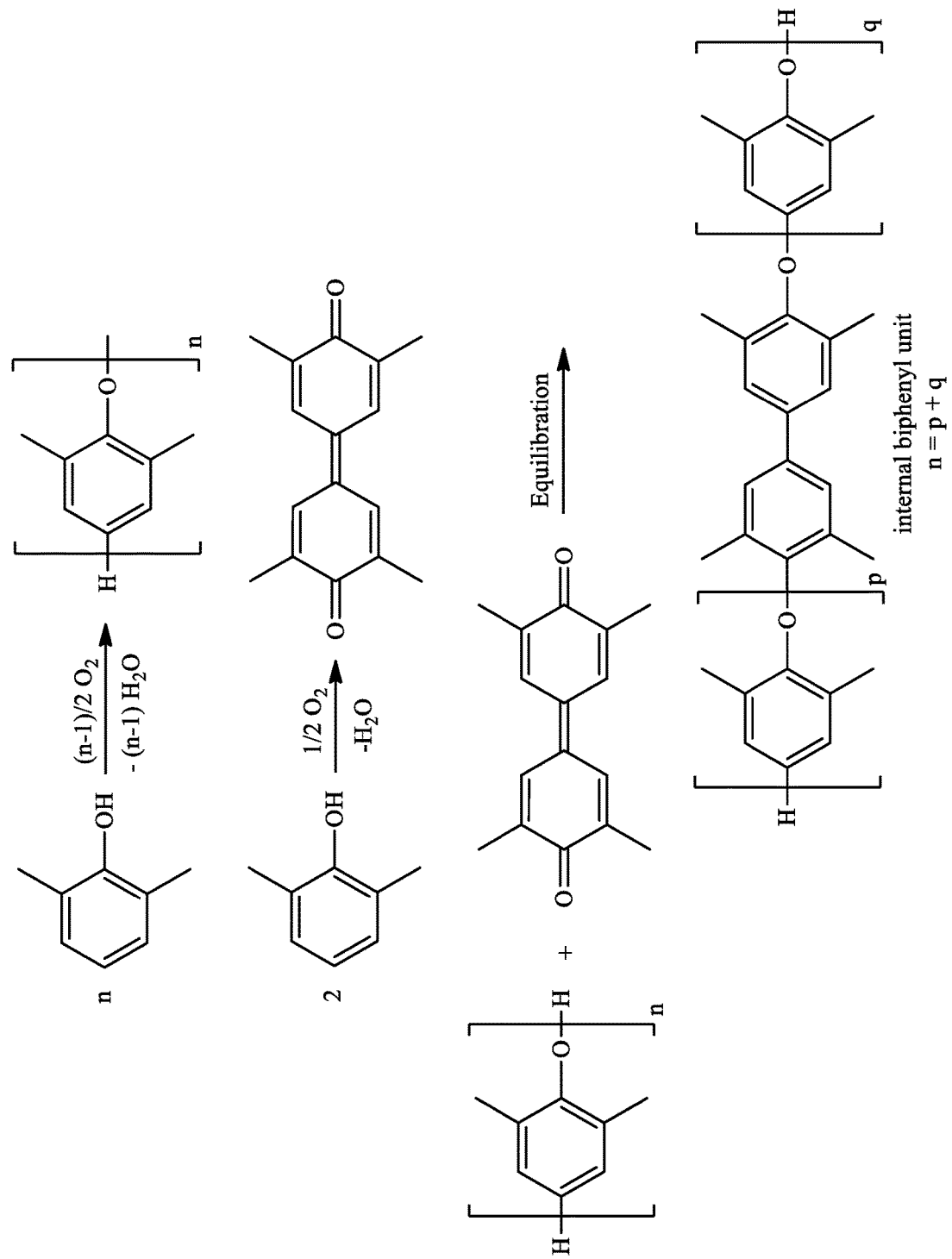
FIG. 2 is a reaction scheme for oxidative polymerization of 2,6-dimethylphenol forming poly(2,6-dimethyl-4-phenylene ether), oxidative dimerization of 2,6-dimethylphenol forming 2,2',6,6'-diphenoquinone; and equilibration of 2,2',6,6'-diphenoquinone with poly(2,6-dimethyl-4-phenylene ether) forming internal and terminal biphenyl units derived from the 2,2',6,6'-diphenoquinone.
Figure 3:
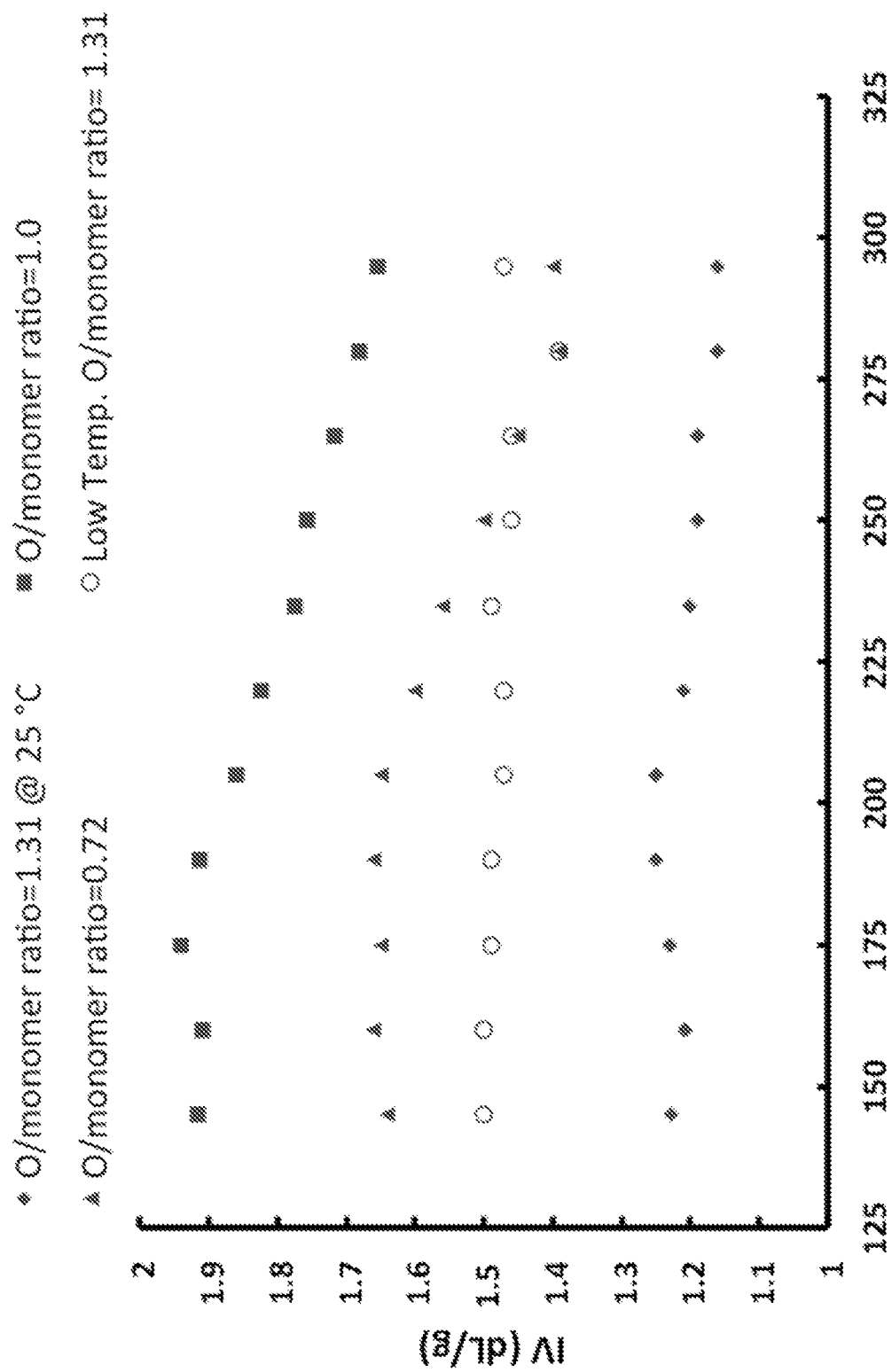
FIG. 3 is a plot of Ubbelohde intrinsic viscosity in dL/g as a function of equilibration time at O/monomer mole ratios of 0.72, 1.0, and 1.31 (at 20 and 25° C.).
Figure 4:
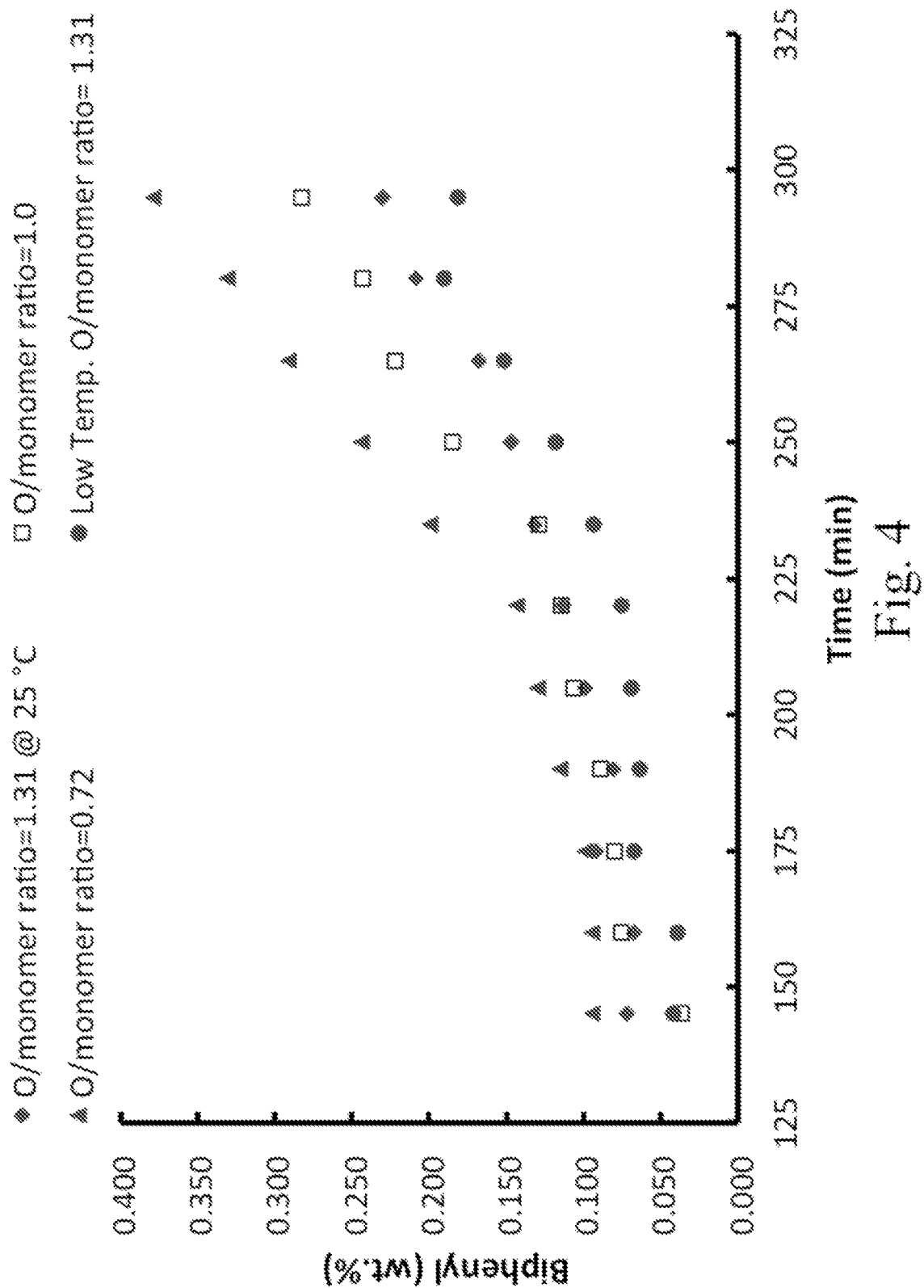
FIG. 4 is a plot of biphenyl content (internal and terminal biphenyl content combined) in weight percent as a function of equilibration time at O/monomer mole ratios of 0.72, 1.0, and 1.31 (at 20 and 25° C.).
Figure 7:
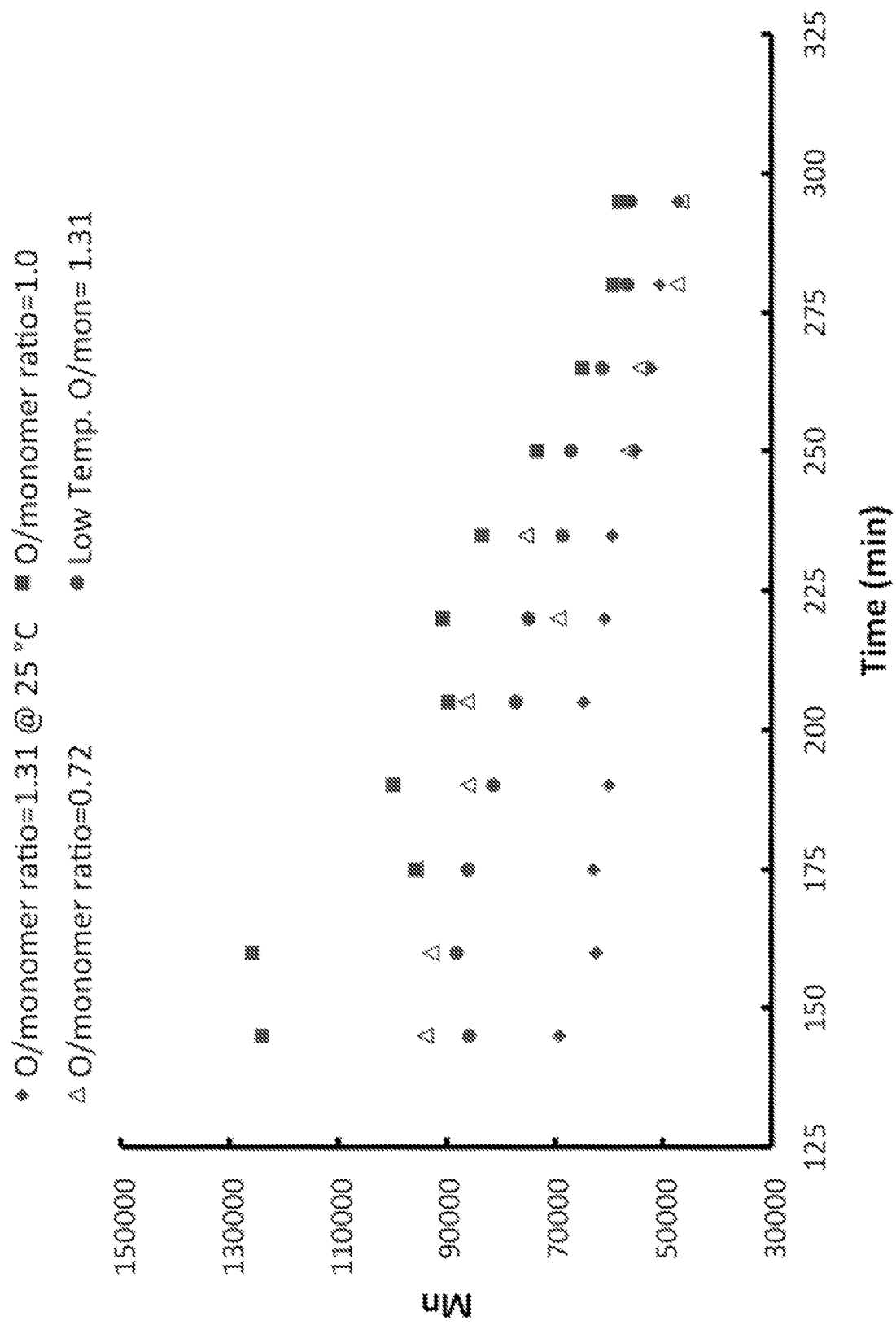
FIG. 7 is a plot of number-average molecular weight in daltons as a function of equilibration time at O/monomer mole ratios of 0.72, 1.0, and 1.31 (at 20 and 25° C.).
Figure 8:
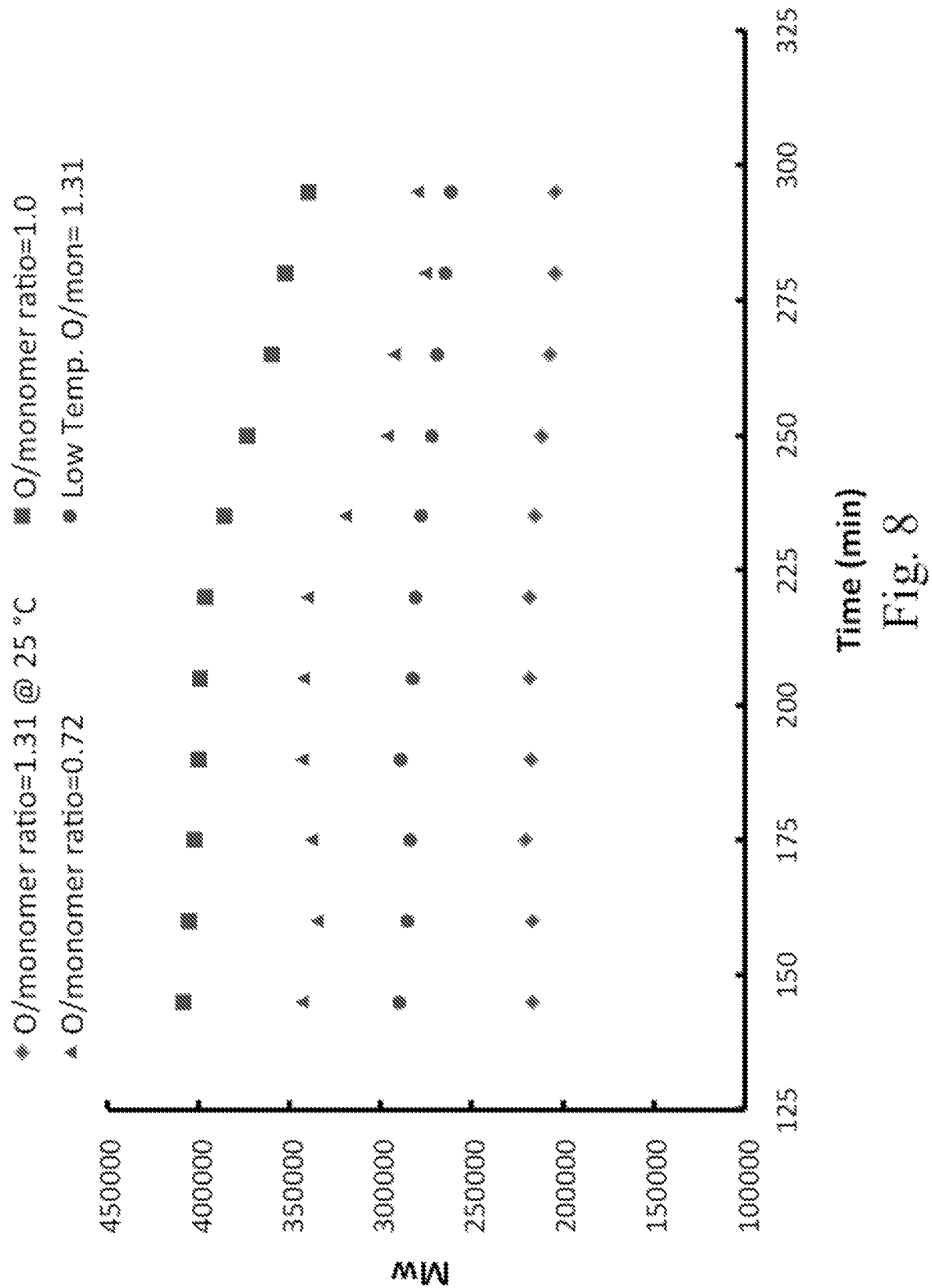
FIG. 8 is a plot of weight-average molecular weight in daltons as a function of equilibration time at O/monomer mole ratios of 0.72, 1.0, and 1.31 (at 20 and 25° C.).
Figure 9:
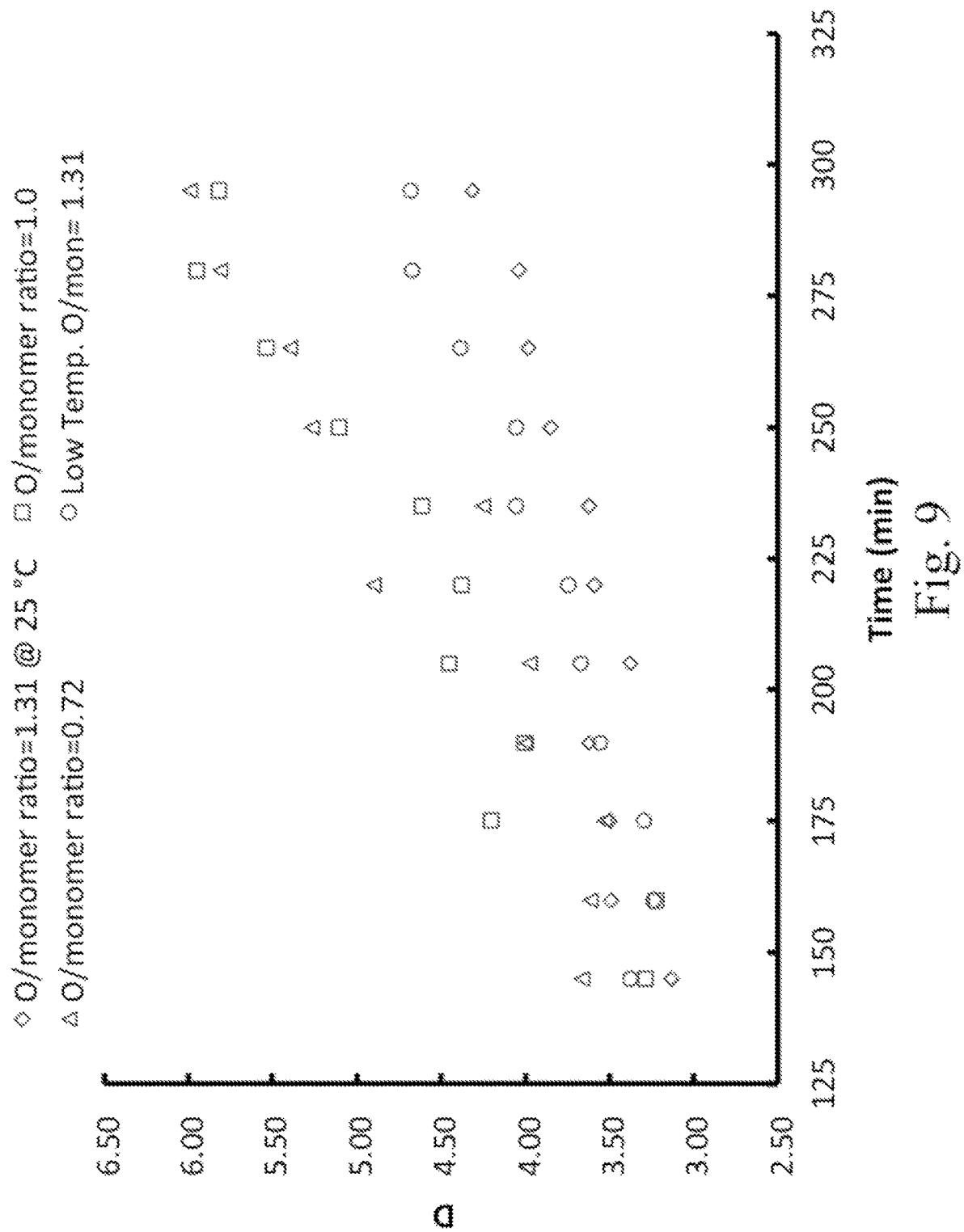
FIG. 9 is a plot of polydispersity (Ð) as a function of equilibration time at O/monomer mole ratios of 0.72, 1.0, and 1.31 (at 20 and 25° C.).

FIG. 2 illustrates some of the chemical reactions associated with equilibration when the monohydric phenol is 2,6-dimethylphenol. 2,6-Dimethylphenol is oxidatively polymerized to poly(2,6-dimethyl-1,4-phenylene ether); and in a side reaction, oxidatively dimerized to 2,2',6,6'-diphenoquinone (TMDQ). In the absence of oxygen during the equilibration period, TMDQ is incorporated into the poly(2,6-dimethyl-4-phenylene ether) backbone to form internal or terminal TMDQ. The TMDQ serves as both oxidant and reactant in these reactions. Equilibration also results in poly(2,6-dimethyl-4-phenylene ether) chain scission. As can be seen from Examples 1-4, intrinsic viscosity (FIG. 3), number-average molecular weight (FIG. 7), and weight-average molecular weight (FIG. 8) decrease during the equilibration period, and biphenyl content (FIG. 4) and polydispersity (FIG. 9) increases during the equilibration period, relative to the poly(2,6-dimethyl-4-phenylene ether) present at the end of the build period.

In some embodiments of the method and poly(phenylene ether) made by the method, the monohydric phenol is 2,6-dimethylphenol; the poly(phenylene ether) is poly(2,6-dimethyl-4-phenylene ether); and after the equilibration period, the poly(2,6-dimethyl-4-phenylene ether) has, based on the total weight of the poly(2,6-dimethyl-4-phenylene ether), 0.01 to 2.0 weight percent of biphenyl units:

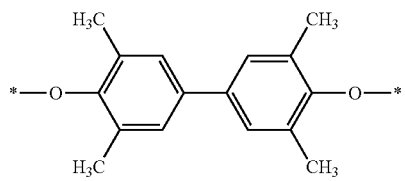

derived from 2,2',6,6'-diphenoquinone, as determined by $^1$H-NMR spectroscopy. Within this range, the poly(2,6-dimethyl-4-phenylene ether) has greater than or equal to 0.05, 0.10, or 0.15 weight percent, and less than or equal to 1.5, 1.0, 0.9, 0.8, 0.7, 0.6, 0.5, or 0.4 weight percent, of biphenyl units. In some embodiments, the poly(2,6-dimethyl-4-phenylene ether) has 0.1 to 1.0 weight percent of biphenyl units. Although biphenyl content is minimized at an O/monomer mole ratio greater than 1.2:1 (1.31:1 in FIG. 4), this is offset by the reduced intrinsic viscosity obtained at this O/monomer mole ratio (1.31:1 in FIG. 3).

When at least one of substituents $Z^1$ in the monohydric phenol is a methyl group, the poly(phenylene ether) made by the method comprises minor amounts of covalently bound monoamine groups which are derived from an amine used in the method by reaction with the methyl group. The covalently bound monoamine groups are present as aminomethyl groups ortho to the ether oxygen atoms in internal units and as aminomethyl groups ortho to the phenol oxygen in terminal units. For example, when the amine is dibutylamine, the internal units can have the structure:

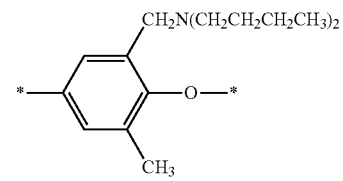

and the terminal units can have the structure:

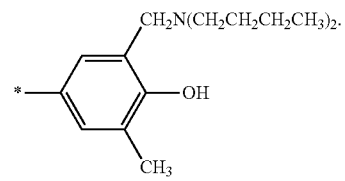

The amounts of covalently bound monoamine groups can be determined by $^1$H-NMR spectroscopy.

Figure 5:
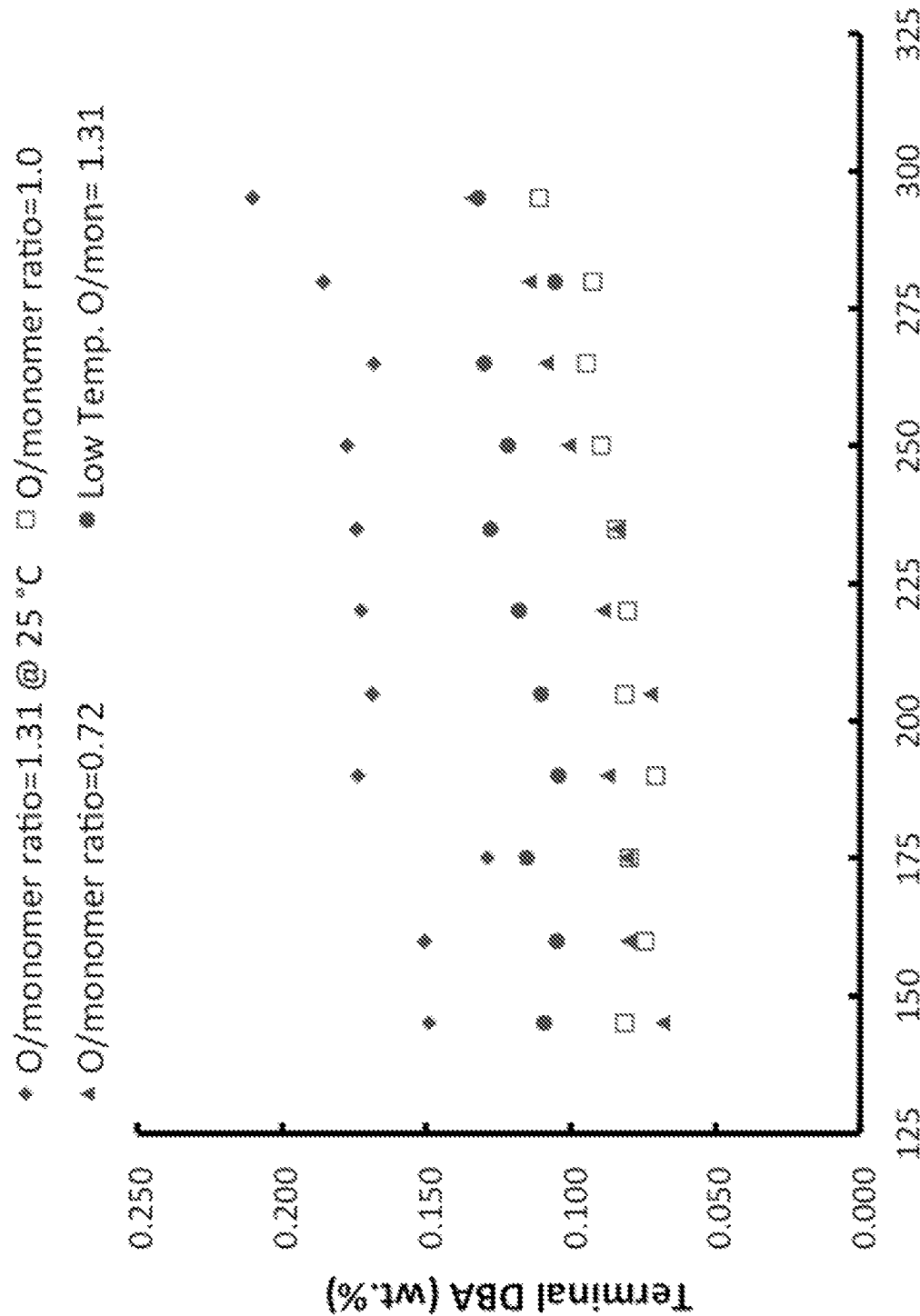
FIG. 5 is a plot of terminal dibutylamine content in weight percent as a function of equilibration time at O/monomer mole ratios of 0.72, 1.0, and 1.31 (at 20 and 25° C.).
Figure 6:
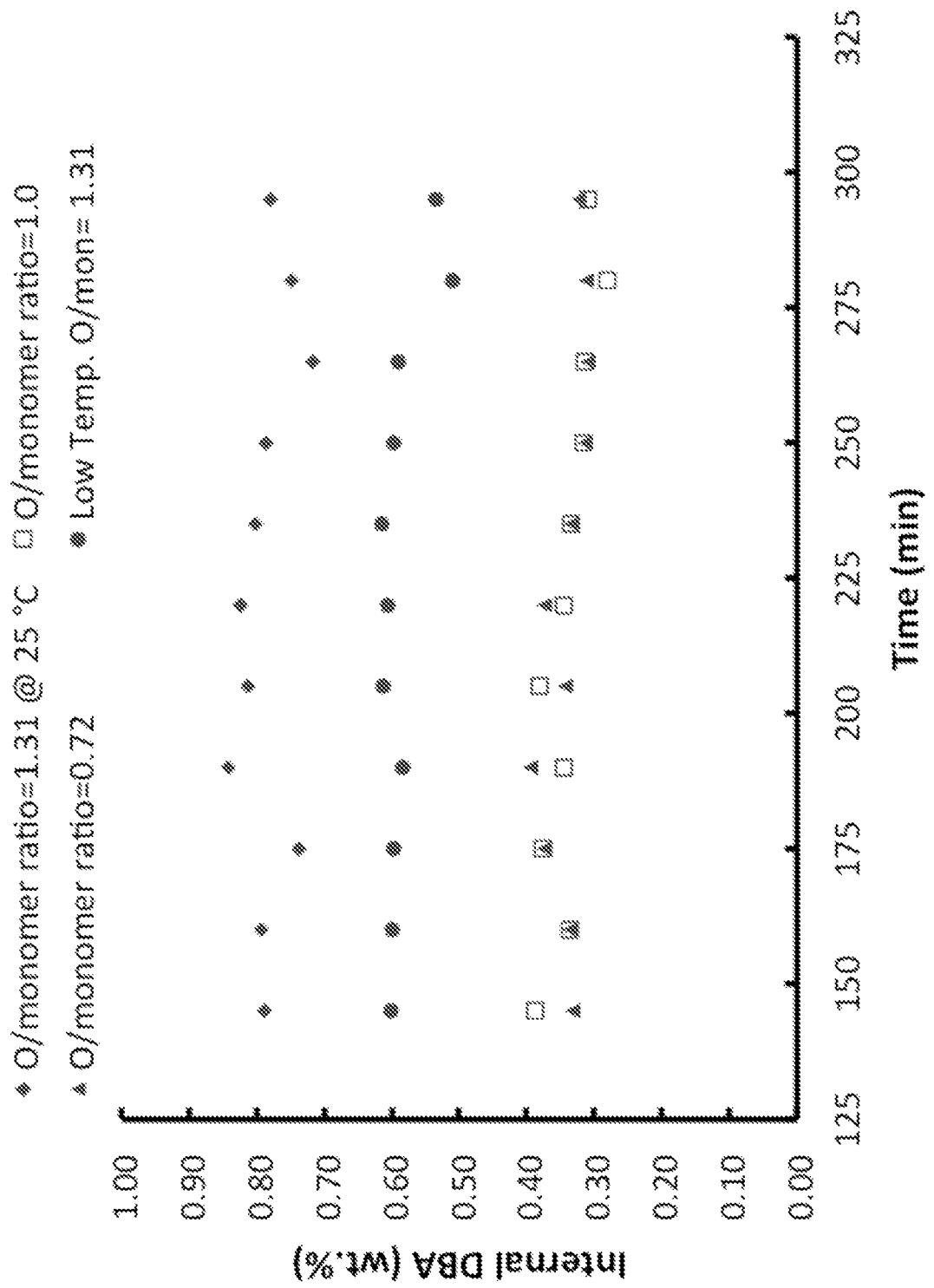
FIG. 6 is a plot of internal dibutylamine content in weight percent as a function of equilibration time at O/monomer mole ratios of 0.72, 1.0, and 1.31 (at 20 and 25° C.).

The effects of O/monomer mole ratios and equilibration time on internal and terminal dibutylamine content was studied in Examples 1-4. FIG. 5 is a plot of terminal dibutylamine content in weight percent as a function of equilibration time at O/monomer mole ratios of 0.72, 1.0, and 1.31 (at 20 and 25° C.), and FIG. 6 is a plot of internal dibutylamine content in weight percent as a function of equilibration time at O/monomer mole ratios of 0.72, 1.0, and 1.31 (at 20 and 25° C.). As mentioned above, intrinsic viscosity is optimized at an O/monomer mole ratio of 0.95:1 to 1.20:1. Above this range, amine incorporation can be increased. As can be seen from FIGS. 5 and 6, terminal and internal dibutylamine contents are highest at an O/monomer mole ratio of 1.31:1. The high dibutylamine incorporation at high O/monomer mole ratios can interfere with polymerization, molecular weight build, and the intrinsic viscosity obtained. Advantageously, dibutylamine content is low and intrinsic viscosity is highest at an O/monomer mole ratio of 1.0:1, which is within the range of 0.95 to 1.20:1.

Thus, in some embodiments of the method and poly(phenylene ether) made by the method, the monohydric phenol is 2,6-dimethylphenol; the amine comprises dibutylamine; the poly(phenylene ether) is poly(2,6-dimethyl-4-phenylene ether); and after the equilibration period, the poly(2,6-dimethyl-4-phenylene ether) has, based on the total weight of the poly(2,6-dimethyl-4-phenylene ether), 0.1 to 2.0 weight percent combined of internal dibutylamino units and terminal dibutylamino units derived from dibutylamine, as determined by $^1$H-NMR spectroscopy. Within this range, the amount of internal dibutylamino units and terminal dibutylamino units derived from dibutylamine can be greater than or equal to 0.1, 0.2, 0.3 or 0.4 weight percent, and less than or equal to 2.0, 1.5, 1.4, 1.3, 1.2, or 1.1 weight percent. The amount of internal dibutylamino units and terminal dibutylamino units derived from dibutylamine can be, for example, 0.2 to 1.5 weight percent, specifically 0.4 to 1.4 weight percent.

The amount of diphenoquinone formation and biphenyl incorporation can depend upon the amount of a first portion of the monohydric phenol added prior to continuous addition of the second portion. Thus, in some embodiments of the method and the poly(phenylene ether) made by the method, a second portion of the monohydric phenol is continuously added to a first portion of the monohydric phenol, the non-polar solvent and polymerization catalyst; wherein the first portion comprises 1 to 20 weight percent of the monohydric phenol and the second portion comprises 80 to 99 weight percent, of the monohydric phenol. Within these ranges, the first portion can comprise greater than or equal to 1, 2, 3, 4, or 5 weight percent and less than or equal to 20, 15, 12, 10, or 7 weight percent of the monohydric phenol; and the second portion can comprise greater than or equal to 80, 85, 88, 90, or 93 weight percent and less than or equal to 99, 98, 97, 96, or 95 weight percent of the monohydric phenol. For example, the first portion can comprise 3 to 12 weight percent of the monohydric phenol and the second portion can comprise 88 to 97 weight percent of the monohydric phenol; or the first portion can comprise 3 to 7 weight percent of the monohydric phenol and the second portion can comprise 93 to 97 weight percent of the monohydric phenol.

The amount of diphenoquinone formation and biphenyl incorporation can also depend on the rate of continuous addition of the second portion of the monohydric phenol. In some embodiments of the method and the poly(phenylene ether) made by the method, the second portion of monohydric phenol is added over a period of 10 to 120 minutes. Within this range, the second portion of the monohydric phenol can be added over a period of greater than or equal to 10, 20, or 30 minutes and less than or equal to 90, 60, 50, or 40 minutes. For example, the second portion of the monohydric phenol can be added in 30 to 60 minutes. In some embodiments, the second portion of monohydric phenol is added over a period of 30 to 36 minutes.

In some embodiments of the method and the poly(phenylene ether) made by the method, the monohydric phenol is 2,6-dimethylphenol; the poly(phenylene ether) is poly(2,6-dimethyl-4-phenylene ether) having an intrinsic viscosity of 0.8 to 1.7 deciliters per gram, measured in chloroform using an Ubbelohde capillary glass viscometer at 25° C., and a polydispersity of 3 to 6; the mole ratio is 0.8:1 to 1.2:1; oxidative polymerization comprises continuous addition of a second portion of the monohydric phenol and oxygen to a first portion of the monohydric phenol, the non-polar solvent, and polymerization catalyst; the first portion comprises 3 to 12 weight percent of the monohydric phenol and the second portion comprises 88 to 97 weight percent of the monohydric phenol; and the second portion of the monohydric phenol is added over a period of 20 to 60 minutes.

The invention includes at least the following embodiments.

Embodiment 1

A method of making a poly(phenylene ether) having an intrinsic viscosity of 0.5 to 2.0 deciliters per gram, measured in chloroform using an Ubbelohde capillary glass viscometer at 25° C., a polydispersity of 1 to 10, and a unimodal molecular weight distribution comprising: in an exotherm period, continuous addition of oxygen and a monohydric phenol of the structure:

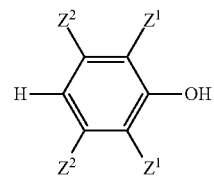

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms, to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.5:1 to 1.2:1; and cessation of the continuous addition of the monohydric phenol; and in a build period, continuation of oxygen addition until there is no further increase in viscosity of the polymerization mixture.

Embodiment 2

The method of embodiment 1, wherein the monohydric phenol is 2,6-dimethylphenol and the poly(phenylene ether) is poly(2,6-dimethyl-4-phenylene ether).

Embodiment 3

The method of embodiment 1, wherein the monohydric phenol comprises a first monohydric phenol that is 2,6-dimethylphenol and a second monohydric phenol that is 2-methyl-6-phenylphenol or 2,6-diphenylphenol.

Embodiment 4

The method of any of embodiments 1-3, wherein the weight-average molecular weight of the poly(phenylene ether) is 60,000 to 500,000 daltons, as measured by gel permeation chromatography.

Embodiment 5

The method of any of embodiments 1-4, further comprising, after completion of the exotherm period and build period: cessation of oxygen addition; flushing oxygen from a gaseous head space above the polymerization mixture; addition of a aqueous chelating agent to the polymerization mixture; and in an equilibration period, holding the polymerization mixture for 0.1 to 24 hours at 30 to 80° C.

Embodiment 6

The method of embodiment 5, wherein the monohydric phenol is 2,6-dimethylphenol; the poly(phenylene ether) is poly(2,6-dimethyl-4-phenylene ether); and after the equilibration period, the poly(2,6-dimethyl-4-phenylene ether) has, based on the total weight of the poly(2,6-dimethyl-4-phenylene ether), 0.01 to 2 weight percent of biphenyl units:

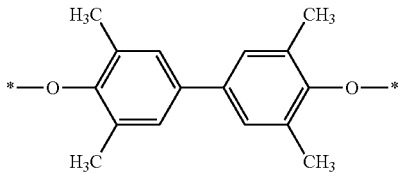 [SMILES: *Oc1c(C)cc(-c2cc(C)c(O*)c(C)c2)cc1C]

derived from 2,2',6,6'-diphenoquinone, as determined by $^1$H-NMR spectroscopy.

Embodiment 7

The method of embodiment 5 or 6, wherein: the monohydric phenol is 2,6-dimethylphenol; the amine comprises dibutylamine; the poly(phenylene ether) is poly(2,6-dimethyl-4-phenylene ether); and after the equilibration period, the poly(2,6-dimethyl-4-phenylene ether) has, based on the total weight of the poly(2,6-dimethyl-4-phenylene ether), 0.5 to 2.0 weight percent combined of dibutylamino groups covalently bound to internal 2,6-dimethylphenol repeat units as follows:

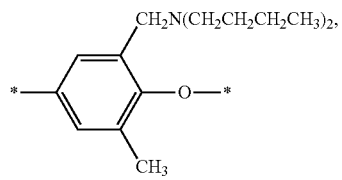

and to terminal 2,6-dimethylphenol units as follows:

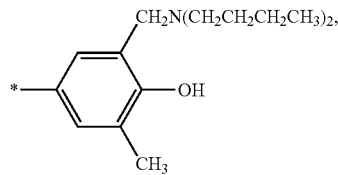

as determined by $^1$H-NMR spectroscopy.

Embodiment 8

The method of any of embodiments 1-7, wherein a second portion of the monohydric phenol is continuously added to a first portion of the monohydric phenol, the non-polar solvent and polymerization catalyst; wherein the first portion comprises 1 to 20 weight percent of the monohydric phenol and the second portion comprises 80 to 99 weight percent of the monohydric phenol.

Embodiment 9

The method of embodiment 8, wherein the second portion of monohydric phenol is added over a period of 10 to 120 minutes.

Embodiment 10

The method of embodiment 1, wherein: the monohydric phenol is 2,6-dimethylphenol; the poly(phenylene ether) is poly(2,6-dimethyl-4-phenylene ether) having an intrinsic viscosity of 0.8 to 1.7 deciliters per gram, measured in chloroform using an Ubbelohde capillary glass viscometer at 25° C., and a polydispersity of 3 to 6; the mole ratio is 1.0:1 to 1.2:1; oxidative polymerization comprises continuous addition of a second portion of the monohydric phenol and oxygen to a first portion of the monohydric phenol, the non-polar solvent, and polymerization catalyst; the first portion comprises 3 to 12 weight percent of the monohydric phenol and the second portion comprises 88 to 97 weight percent of the monohydric phenol. and the second portion of the monohydric phenol is added over a period of 20 to 60 minutes.

Embodiment 11

A poly(phenylene ether) having an intrinsic viscosity of 0.5 to 2.0 deciliters per gram, measured in chloroform using an Ubbelohde capillary glass viscometer at 25° C., a polydispersity of 1 to 10, and a unimodal molecular weight distribution, made by a method comprising: in an exotherm period, continuous addition of oxygen and a monohydric phenol of the structure:

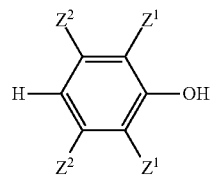

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms, to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.5:1 to 1.2:1; and cessation of the continuous addition of the monohydric phenol; and in a build period, continuation of oxygen addition until there is no further increase in viscosity of the polymerization mixture.

Embodiment 12

The poly(phenylene ether) of embodiment 11, wherein the monohydric phenol is 2,6-dimethylphenol, and the poly(phenylene ether) is poly(2,6-dimethyl-4-phenylene ether).

Embodiment 13

The poly(phenylene ether) of embodiment 11, wherein the monohydric phenol comprises a first monohydric phenol that is 2,6-dimethylphenol and a second monohydric phenol that is 2-methyl-6-phenylphenol or 2,6-diphenylphenol; and the poly(phenylene ether) is poly(2,6-dimethyl-1,4-phenylene ether-co-2-methyl-6-phenyl-1,4-phenylene ether) or poly(2,6-dimethyl-1,4-phenylene ether-co-2,6-diphenyl-1,4-phenylene ether).

Embodiment 14

The poly(phenylene ether) of any of embodiments 11-13, wherein the weight-average molecular weight of the poly(phenylene ether) is 60,000 to 500,000 daltons, as measured by gel permeation chromatography.

Embodiment 15

The poly(phenylene ether) of any of embodiments 11-14, wherein the method further comprises, after completion of the exotherm period and build period: cessation of oxygen addition; flushing oxygen from a gaseous head space above the polymerization mixture; addition of a aqueous chelating agent to the polymerization mixture; and in an equilibration period, holding the polymerization mixture for 0.1 to 24 hours at 30 to 80° C.

Embodiment 16

The poly(phenylene ether) of embodiment 15, wherein the monohydric phenol is 2,6-dimethylphenol; the poly(phenylene ether) is poly(2,6-dimethyl-4-phenylene ether); and after the equilibration period, the poly(phenylene ether) has, based on the total weight of the poly(phenylene ether), 0.01 to 0.08 weight percent of biphenyl units:

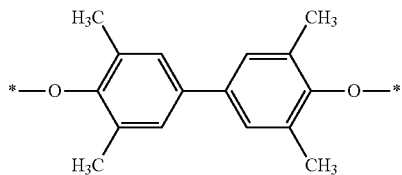 [SMILES: *Oc1c(C)cc(-c2cc(C)c(O*)c(C)c2)cc1C]

derived from 2,2',6,6'-diphenoquinone, as determined by $^1$H-NMR spectroscopy.

Embodiment 17

The poly(phenylene ether) of embodiment 15 or 16, wherein: the monohydric phenol is 2,6-dimethylphenol; the amine comprises dibutylamine; the poly(phenylene ether) comprises poly(2,6-dimethyl-4-phenylene ether); and after the equilibration period, the poly(2,6-dimethyl-4-phenylene ether) has, based on the total weight of the poly(2,6-dimethyl-4-phenylene ether), 0.1 to 1.2 weight percent combined of dibutylamino groups covalently bound to internal 2,6-dimethylphenol repeat units as follows:

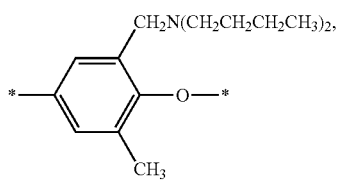

and to terminal 2,6-dimethylphenol units as follows:

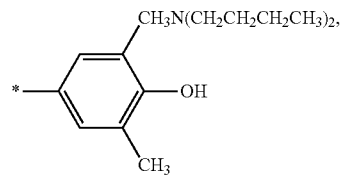

as determined by $^1$H-NMR spectroscopy.

Embodiment 18

The poly(phenylene ether) of any of embodiments 11-17, wherein a second portion of the monohydric phenol is continuously added to a first portion of the monohydric phenol, the non-polar solvent, and polymerization catalyst; wherein the first portion comprises 1 to 20 weight percent of the monohydric phenol and the second portion comprises 80 to 99 weight percent of the monohydric phenol.

Embodiment 19

The poly(phenylene ether) of embodiment 18, wherein the second portion of monohydric phenol is added over a period of 10 to 120 minutes.

Embodiment 20

The poly(phenylene ether) of embodiment 11, wherein: the monohydric phenol is 2,6-dimethylphenol; the poly(phenylene ether) comprises poly(2,6-dimethyl-4-phenylene ether) having an intrinsic viscosity of 0.8 to 1.7 deciliters per gram, measured in chloroform using an Ubbelohde capillary glass viscometer at 25° C. and a polydispersity of 3 to 6; the oxygen and monohydric phenol are added in a mole ratio of 1.0:1 to 1.2:1; oxidative polymerization comprises continuous addition of a second portion of the monohydric phenol and oxygen to a first portion of the monohydric phenol, the non-polar solvent, and polymerization catalyst; the first portion comprises 3 to 12 weight percent of the monohydric phenol and the second portion comprises 88 to 97 weight percent of the monohydric phenol; and the second portion of the monohydric phenol is added over a period of 30 to 60 minutes.

EXAMPLES

The materials utilized in the examples are identified below in Table 1.

TABLE 1

| Material | Description |
|---|---|
| DMP | 2,6-Dimethylphenol (2,6-xylenol); C.A.S. Reg. No. 576,26-1. |
| Cu$_2$O | Cuprous oxide; C.A.S. Reg. No. 1317-39-1. |
| HBr | Hydrobromic acid; C.A.S. Reg. No. |
| DBEDA | Di-tert-butylethylenediamine; C.A.S. Reg. No. 10035-10-6. |
| DBA | Di-n-butylamine; C.A.S. Reg. No. 111-92-2. |
| DMBA | N,N-Dimethylbutylamine; C.A.S. Reg. No. 927-62-8. |
| QUAT | N,N,N',N'-Didecyldimethyl ammonium chloride; C.A.S. Reg. No. 7173-51-5, available as MAQUAT ™ from Mason Chemical Company. |
| NTA | Nitrilotriacetic acid trisodium salt; C.A.S. Reg. No. 5064-31-3. |

TABLE 1-continued

| Material | Description |
|---|---|
| MEK | Methyl ethyl ketone; C.A.S. Reg. No. 78-93-3. |
| TMDQ | 2,2',6,6'-diphenoquinone; C.A.S. Reg. No. 68424-85-1 |

Intrinsic viscosity (Ubbelohde, IV) was measured in chloroform using an Ubbelohde capillary glass viscometer at 25° C. in a thermostatted water bath.

Number average molecular weight ($M_n$), weight average molecular weight ($M_w$) and polydispersity (D) were measured by gel permeation chromatography (GPC) using an Agilent or Malvern GPC. Samples were dissolved in chloroform at 1 mg/mL, and sample injection volume was 20 µL. Measurements were made soon after preparation of the sample solutions due to instability of the poly(2,6-dimethyl-4-phenylene ether) in chloroform. The mobile phase was chloroform containing 200 µL of DBA per 4 L. A Phenomenex PHENOGEL™ 5 µm Linear/Mixed, 50×7.8 mm guard column with 5-µm particles in combination with a Phenomenex PHENOLGEL™ 5 µM Linear (2), 300×7.8 mm column with 5-µm particles was used. The detection wavelength for the polystyrene standard was 254 nm and that of poly(2,6-dimethyl-4-phenylene ether) was 280 nm.

Intrinsic viscosity (Agilent) was calculated using the Agilent GPC data. A third order polynomial fit was generated using polystyrene standards obtained from Agilent. The molecular weight range of the standard varied between 575 to 990,500 daltons (Da). For poly(2,6-dimethyl-4-phenylene ether), the Mark-Houwink coefficients, 'k' and 'a' used in the quantification were 0.0483 and 0.64, respectively. The equation used to convert the molecular weight to IV is given below:

$$IV = (0.3122)*(Mw)^{1.073}$$

The Malvern GPC method was similar to the Agilent method, with the following differences. Approximately 60 mg of PPE was dissolved in 20 mL of chloroform (3 mg/mL) by shaking for 1 hr. The GPC was equipped with two Viscotek TM6000M General Mixed Columns. The flow rate was 1 mL/min. A dn/dc value of 0.163 was used to estimate the intrinsic viscosity of the polymeric resin.

Proton Nuclear Magnetic Resonance ($^1$H-NMR) spectroscopy was utilized for measuring the weight percent of biphenyl units derived from 3,3',5,5'-tetramethyl-4,4'-biphenol, and terminal, internal, and cyclic aminomethyl groups derived from dibutylamine (DBA) in solid samples. Samples were prepared by dissolving 0.06 g of poly(2,6-dimethyl-4-phenylene ether) in deuterated chloroform ($CDCl_3$).

The "biphenyl" content is the weight percent of 3,3',5,5'-tetramethyl-4,4'-biphenol units, i.e. units having structure:

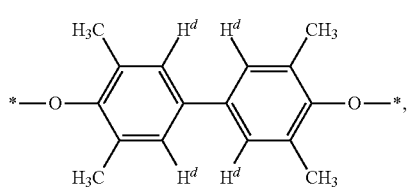

and was determined by integrating the protons labeled "d" and the protons labeled "a" in internal DMP unit:

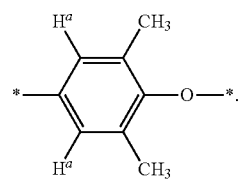

In particular, biphenyl content is defined as:

$$\% \text{ Biphenyl} = \frac{Y}{Y+Z} \times 100,$$

wherein:

$$Y = \frac{\text{Peak ``}H^{d}\text{'' Integral@ 7.35 ppm} \times \text{MW (biphenyl)}}{4},$$

wherein "MW (biphenyl)" is the molecular weight of the 3,3',5,5'-tetramethyl-4,4'-biphenol unit, or 240.30 Da;

$$Z = \frac{\text{Peak ``}H^{a}\text{'' Integral@ 6.47 ppm} \times \text{MW (DMP)}}{2};$$

and "MW (DMP)" is the molecular weight of the internal DMP unit, or 120.15 Da.

"Internal DBA" ("Int. DBA") refers to dibutylamino groups covalently bound to internal 2,6-dimethylphenol repeat units as follows:

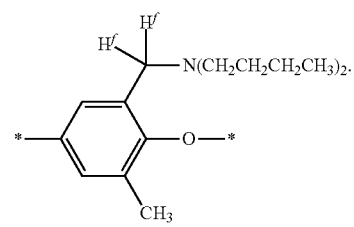

Internal DBA content was determined by integrating the peak for the methylene protons labeled "f". In particular:

$$\text{Int. DBA (wt. \%)} = \frac{U}{U+V+W+X+Y+Z} \times 100,$$

wherein:

$$U = \frac{\text{Peak ``}H^{f}\text{'' Integral@ 3.34 ppm} \times \text{MW (DBA)}}{2},$$

and "MW (DBA)" is the molecular weight of a dibutylamino radical, or 128.24 Da.

"Terminal DBA" ("Term. DBA") refers to dibutylamino groups covalently bonded to terminal 2,6-dimethylphenol repeat units as follows:

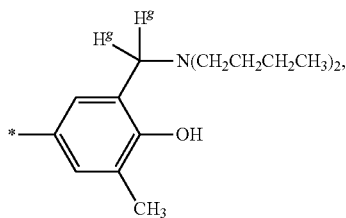

and was determined by integrating the peak for the methylene protons labeled "g". In particular:

$$\text{Term. DBA (wt. \%)} = \frac{V}{U+V+W+X+Y+Z} \times 100,$$

wherein:

$$V = \frac{\text{Peak ``}H^f\text{'' Integral@ 3.62 ppm} \times \text{MW }(DBA)}{2}.$$

"Cyclic DBA" refers to dibutylamino groups that form a 6-membered ring with terminal 2,6-dimethylphenol units as follows:

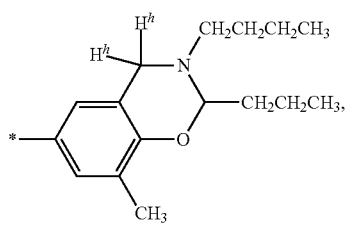

and was determined by integrating the peak for the methylene protons labeled "h". In particular:

$$\text{Term. DBA (wt. \%)} = \frac{W}{U+V+W+X+Y+Z} \times 100,$$

wherein:

$$W = \frac{\text{Peak ``}H^f\text{'' Integral@ 3.62 ppm} \times \text{MW (Cylic }DBA)}{2},$$

and "MW (Cyclic DBA)" is the molecular weight of a dibutylamino diradical, or 127.23 Da.

"MBA" refers to monobutylamino groups covalently bonded to terminal 2,6-dimethylphenol units as follows:

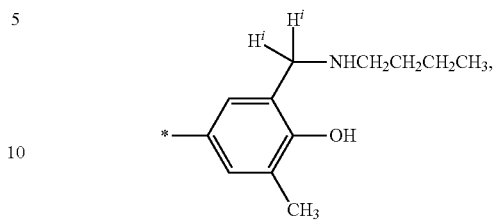

and was determined by integrating the peak for the methylene protons labeled "i". In particular:

$$\text{MBA (wt. \%)} = \frac{X}{U+V+W+X+Y+Z} \times 100,$$

wherein:

$$X = \frac{\text{Peak ``}H^i\text{'' Integral@ 3.62 ppm} \times \text{MW }(MBA)}{2},$$

and "MW (MBA)" refers to the molecular weight of a monobutylamino radical, or 72.13 Da. "Total DBA" in Tables 2-6 refers to the combined weight percent of internal and terminal DBA units, as the amounts of cyclic DBA and MBA are generally relatively small.

General Procedure for Preparation of Poly(2,6-Dimethyl-4-Phenylene Ether) in 1-Gallon RC1 Reactor Poly(2,6-dimethyl-4-phenylene ether) was prepared in a 1-gallon RC1™ reaction calorimeter as follows, with stirring throughout the procedure. An approximately 50 wt. % solution of 0.16 lb. monomer (2,6-dimethylphenol, DMP) in toluene was prepared. (The total amount of toluene added to the calorimeter provided a total monomer concentration of 7 wt. %). A catalyst solution was prepared from 0.3795 g Cu$_2$O dissolved in 4.81 g 48 wt. % aqueous HBr. 10 wt. % of the monomer solution, catalyst solution (7.05 wt. % based on total monomer, or 0.011 lb., unless indicated otherwise), DMBA (1 wt. % based on total toluene, or 0.021 lb. unless indicated otherwise), and 0.013 lb. of a diamine mixture of 30:16:54 parts by weight DBEDA, 50% aqueous QUAT, and toluene, were added to the calorimeter.

The remaining 90% of the monomer solution was dosed into the calorimeter at a rate of 2.88 grams per minute, and molecular oxygen (O$_2$) was simultaneously sparged through a dip tube at 0.377, 0.288, or 0.210 standard cubic feet per hour (SCFH) at 25° C. to initiate oxidative polymerization. The O/monomer mole ratio was 0.72:1, 1.0:1, or 1.31:1. The initial phase of the polymerization was exothermic, and cooling was used to maintain a temperature of 25° C., unless indicated otherwise.

When the exotherm period was completed (70 minutes), the "build" period of the polymerization began, and external heating was required to maintain a polymerization temperature of 25° C., unless indicated otherwise. O$_2$ sparging was continued at the same rate as in the exotherm period to continue the oxidative polymerization. However, when a large increase in $O_2$ headspace occurred, the addition rate was adjusted to maintain a headspace $O_2$ concentration of no greater than about 20 volume percent. A flow of nitrogen (0.864 SCFH unless indicated otherwise) into the head space of the calorimeter was maintained throughout the exotherm and build periods.

When the build period was complete (57 minutes), the $O_2$ flow was stopped, which terminated oxidative polymerization, $O_2$ in the headspace was flushed out with $N_2$, an aqueous solution of NTA) was added, and the temperature of the resulting mixture was adjusted to 62° C. for equilibration intervals specified in FIG. 3-9.

For isolation of the poly(2,6-dimethyl-4-phenylene ether), water was added, the resulting mixture was stirred for a time sufficient to extract the copper catalyst into the aqueous phase, and the toluene phase was separated from the aqueous phase by liquid-liquid centrifugation. The toluene phase was combined with methanol (antisolvent) to precipitate the poly(2,6-dimethyl-4-phenylene ether) as a powder. The powder was isolated by filtration, reslurried and isolated twice by solid-liquid centrifugation, and dried.

TMDQ is a byproduct of the oxidative polymerization of 2,6-dimethylphenol, and it has been reported that TMDQ yield increases with increasing O/monomer mole ratio. In order to study the effect of the O/monomer mole ratio on TMDQ yield, the ratio was varied between 0.72 to 1.31. While an effort was made to maintain a constant O/monomer mole ratio, the operator reduced the $O_2$ flow rate whenever an excursion in $O_2$ concentration in the reactor head space was detected which suggested $O_2$ breakthrough. This manual change in the $O_2$ flow rate by the operator was not reproducible (i.e. every operator responded differently to the excursion in $O_2$ flow rate and does not respond the same way every time). This introduced batch variability, in particular 0.63 SCFH for Example 3. The exotherm period and build period temperatures were 25° C. for Examples 1-3 and 20° C. for Example 4.

During the equilibration period, when the catalyst is quenched with NTA, and the $O_2$ flow is stopped, the poly (2,6-dimethyl-4-phenylene ether) present is equilibrated with the TMDQ, which generally results in a decrease in intrinsic viscosity and molecular weight. The effects of O/monomer mole ratio on intrinsic viscosity, $M_n$, $M_w$, D, and weight percents of biphenyl, terminal DBA, and internal DBA were measured as a function of equilibration time, and the results are summarized in FIG. 3-9. As can be seen from FIG. 3, the highest IV is obtained with an O/monomer mole ratio of 1.0. As can be seen from FIG. 4, the formation of TMDQ, as evidenced by biphenyl content, increases as the O/monomer mole ratio is decreased. Without being bound by theory, the low IV (FIG. 3) and high biphenyl content (FIG. 4) obtained at an O/monomer mole ratio of 1.31 suggests the amount of 2,6-dimethylphenoxy radicals is increased at this ratio, which results in increased dimerization to form TMDQ and decreased chain propagation to form poly(2,6-dimethyl-4-phenylene ether).

Examples 2, 5, and 6: Effect of DBA Amount on DBA Incorporation

In Examples 2, 5 and 6, the general procedure above was followed, with an O/monomer mole ratio of 1.0:1 and an $O_2$ flow of 0.288 SCFH. In Examples 5, 2, and 6, the DBA amounts were 2, 4, and 6 wt. % based on total monomer (~0.003 lb, ~0.007 lb., and ~0.010 lb.) respectively. The results are summarized in Table 2. As can be seen from Table 2, there was no difference in dibutylamine incorporation at the three DBA amounts at an O/monomer mole ratio of 1.0:1. (The highest dibutylamine incorporation was obtained at O/monomer mole ratio of 1.31:1.)

TABLE 2

Extent of DBA Incorporation as a Function of DBA Amount and Equilibration Time

| | Ex. | | | | | | | | |
|---|---|---|---|---|---|---|---|---|---|
| | 5 | | | 2 | | | 6 | | |
| | | | | DBA[a] | | | | | |
| | 2 wt. % | | | 4 wt. % | | | 6 wt. % | | |
| Time (min) | Term. DBA (wt. %) | Int. DBA (wt. %) | Total DBA (wt. %) | Term. DBA (wt. %) | Int. DBA (wt. %) | Total DBA (wt. %) | Term. DBA (wt. %) | Int. DBA (wt. %) | Total DBA (wt. %) |
| 157 | 0.085 | 0.415 | 0.499 | 0.074 | 0.370 | 0.444 | 0.089 | 0.402 | 0.491 |
| 230 | 0.090 | 0.401 | 0.491 | 0.082 | 0.370 | 0.452 | 0.109 | 0.438 | 0.546 |
| 290 | 0.114 | 0.344 | 0.458 | 0.099 | 0.370 | 0.469 | 0.120 | 0.399 | 0.519 |
| 350 | 0.146 | 0.342 | 0.488 | 0.131 | 0.370 | 0.501 | 0.149 | 0.391 | 0.540 |
| Day 2 | 0.160 | 0.278 | 0.438 | 0.180 | 0.370 | 0.550 | — | — | — |

[a]Amount Based on Total Monomer variation in TMDQ yield and total amine incorporated to the polymer. However, general trends can be seen from the data plotted in FIG. 3-9.

Examples 1-4: Effect of Variation of O/Monomer Ratio

In each example, the general procedure above was followed. The $O_2$ flows were adjusted to 0.377, 0.288, 0.210, and 0.377 SCFH in Examples 1-4, respectively, to achieve the corresponding O/monomer mole ratios of 1.31:1, 1.0:1, 0.72:1, and 1.31:1, respectively. The $N_2$ flow was reduced to Examples 2, 7, and 8: Effect of DMBA Amount on DBA Incorporation In Examples 2, 7, and 8, the general procedure above was followed with an O/monomer mole ratio of 1.0:1 and an $O_2$ flow of 0.288 SCFH. In Examples 7, 2, and 8, the DMBA amounts were 0.8, 1.0, and 1.2 wt. % based on total toluene (~0.017 lb, ~0.021 lb., and ~0.025 lb. respectively). The results are summarized in Table 3. As can be seen from Table 3, there was no difference in dibutylamine incorporation at the three DMBA amounts at an O/monomer mole ratio of 1.0:1.

TABLE 3

Extent of DBA Incorporation as a Function of DMBA Amount and Equil. Time

| | Ex. | | | | | | | | |
|---|---|---|---|---|---|---|---|---|---|
| | 7 | | | 2 | | | 8 | | |
| | DMBA[a] | | | | | | | | |
| | 0.8 wt. % | | | 1 wt. % | | | 1.2 wt. % | | |
| Equil. Time (min) | Term. DBA (wt. %) | Int. DBA (wt. %) | Total DBA (wt. %) | Term. DBA (wt. %) | Int. DBA (wt. %) | Total DBA (wt. %) | Term. DBA (wt. %) | Int. DBA (wt. %) | Total DBA (wt. %) |
| 157 | 0.101 | 0.45 | 0.547 | 0.074 | 0.37 | 0.444 | 0.090 | 0.411 | 0.501 |
| 230 | 0.111 | 0.42 | 0.529 | 0.082 | 0.37 | 0.452 | 0.104 | 0.424 | 0.528 |
| 290 | 0.131 | 0.38 | 0.512 | 0.099 | 0.37 | 0.469 | 0.124 | 0.389 | 0.514 |
| 350 | 0.156 | 0.36 | 0.513 | 0.131 | 0.37 | 0.501 | 0.144 | 0.371 | 0.515 |
| Day 2 | 0.190 | 0.32 | 0.512 | 0.18 | 0.37 | 0.550 | 0.168 | 0.328 | 0.496 |

[a]Amount based on total toluene.

Examples 1 and 9-20

The general procedure above was followed, and the O/monomer mole ratio was 1.0 or 1.31. The results are also summarized in Table 4.

TABLE 4

| | | GPC - Agilent Method | | | $^1$H-NMR | | | |
|---|---|---|---|---|---|---|---|---|
| Ex. | IV[a] (dL/g) | O/Mon. Mole Ratio | $M_n$ (Da) | $M_w$ (Da) | D | Biphenyl (wt. %) | Term. DBA (wt. %) | Int. DBA (wt. %) | Total DBA (wt. %) |
| 1 | 1.16 | 1.31 | 47,294 | 203,850 | 4.31 | 0.23 | 0.21 | 0.78 | 0.99 |
| 9 | 1.61 | 1 | 82,200 | 324,500 | 3.95 | 0.08 | 0.09 | 0.48 | 0.57 |
| 10 | 1.40 | 1 | — | — | — | 0.06 | 0.1 | 0.44 | 0.54 |
| 11 | 1.61 | 1 | 59,700 | 306,000 | 5.13 | 0.09 | 0.08 | 0.43 | 0.52 |
| 12 | 1.41 | 1 | 50,282 | 237,330 | 4.72 | 0.09 | 0.08 | 0.5 | 0.58 |
| 13 | 1.58 | 1 | 37,323 | 333,620 | 8.94 | 0.13 | 0.11 | 0.45 | 0.56 |
| 14 | 0.954 | 1.31 | 43,700 | 159,000 | 3.64 | 0.13 | 0.19 | 0.94 | 1.13 |
| 15 | 0.910 | 1.31 | 36,754 | 142,050 | 3.86 | 0.23 | 0.26 | 1.11 | 1.37 |
| 16 | 1.100 | 1.31 | 45,813 | 195,870 | 4.28 | 0.16 | 0.3 | 0.83 | 1.13 |
| 17 | 1.040 | 1 | 43,355 | 193,930 | 4.47 | 0.22 | 0.19 | 0.73 | 0.92 |
| 18 | 0.816 | 1.31 | 34,904 | 125,850 | 3.61 | 0.35 | 0.31 | 0.93 | 1.24 |
| 19 | — | 1.31 | 40,600 | 146,200 | 3.60 | 0.18 | 0.21 | 1.01 | 1.22 |
| 20 | 0.894 | 0.31 | 43,300 | 128,900 | 2.98 | 0.08 | 0.18 | 1.03 | 1.21 |

[a]Ubbelohde method.

Example 21: Preparation of Poly(2-Methyl-6-Phenyl-1,4-Phenylene-Co-2,6-Dimethyl-1,4-Phenylene Ether) (14:86 Mole Ratio)

The copolymer was prepared in a 500-mL stirred glass vessel. A 7 wt. % solution of the monomers (14.22 mole percent 2-methyl-6-phenylphenol and 85.78 mole percent 2,6-dimethylphenol) in toluene was prepared. Approximately 10 wt. % of the toluene solution was charged to the vessel up front and the remainder dosed in over 45 minutes. The catalyst solution ($Cu_2O$ in 48 wt. % aq. HBr) amount was 7.05 wt. % based on total monomer (TM, 0.005 lb.), DBA amount was 4.05% based on TM (~0.003 lb.), DMBA amount was 1% based on total toluene (~0.009 lb.), and DBEDA amount was 0.006 lb. Oxygen was sparged through the dip tube at 0.112 SCFH (O/monomer mole ratio was 1.0). The vessel was blanketed with nitrogen (0.33 SCFH) throughout the polymerization. The polymerization was maintained at 25° C. during the exotherm and build periods (total of 75 min.). The catalyst was chelated with NTA at the end of the build period, and the polymerization mixture was transferred to a jacketed glass vessel and allowed to equilibrate at 62° C. for 285 min.

For isolation of the copolymer, water was added to the polymerization mixture, the resulting mixture was stirred for a time sufficient to extract the copper catalyst into the aqueous phase, and the toluene phase was separated from the aqueous phase by liquid-liquid centrifugation. The toluene phase was combined with methanol (antisolvent) to precipitate the poly(2-methyl-6-phenyl-1,4-phenylene-co-2,6-dimethyl-1,4-phenylene ether) as a powder. The powder was isolated by filtration, reslurried, isolated twice by solid-liquid centrifugation, and dried. Analytical results are summarized in Table 5.

TABLE 5

| | | GPC -Agilent method | | | $^1$H-NMR | | |
|---|---|---|---|---|---|---|---|
| Equil. Time (min.) | IV[a] (dL/g) | $M_w$ (Da) | $M_n$ (Da) | D | External DBA (wt. %) | Internal DBA (wt. %) | Total DBA (wt. %) |
| 60 | 0.86 | 142,930 | 50,881 | 2.81 | 0.032 | 0.206 | 0.238 |
| 70 | 0.85 | 143,860 | 47,634 | 3.02 | 0.024 | 0.174 | 0.198 |
| 185 | 0.84 | 141,510 | 38,001 | 3.72 | 0.027 | 0.173 | 0.200 |

[a]Ubbelohde

Example 22: Preparation of Poly(2,6-Diphenyl-1,4-Phenylene-Co-2,6-Dimethyl-1,4-Phenylene Ether) (11:89 Mole Ratio)

The copolymer was prepared in a 500-mL stirred glass vessel. A 7 wt. % solution of the monomers (11.03 mole percent 2,6-diphenylphenol and 88.97 mole percent 2,6-dimethylphenol) in toluene was prepared. Approximately 10 wt. % of the toluene solution was charged to the vessel up front and the remainder dosed in over 45 minutes. The catalyst ($Cu_2O$ in 48 wt. % aq. HBr) amount was 7.05 wt. % based on TM (0.005 lb.), DBA amount was 4.05% based on TM (~0.003 lb.), DMBA amount was 1% based on total toluene (~0.009 lb.), and DBEDA amount was 0.006 lb. Oxygen was sparged through the dip tube at 0.112 SCFH (O/monomer mole ratio was 1.0). The vessel was blanketed with nitrogen (0.33 SCFH) throughout the polymerization. The polymerization was maintained at 25° C. during the exotherm and build periods (total of 75 min.). The catalyst was chelated with NTA at the end of the build period, and the polymerization mixture was transferred to a jacketed glass vessel and allowed to equilibrate at 62° C. for 285 min.

For isolation of the copolymer, water was added to the polymerization mixture, the resulting mixture was stirred for a time sufficient to extract the copper catalyst into the aqueous phase, and the toluene phase was separated from the aqueous phase by liquid-liquid centrifugation. The toluene phase was combined with methanol (antisolvent) to precipitate the poly(2,6-diphenyl-1,4-phenylene-co-2,6-dimethyl-1,4-phenylene ether) as a powder. The powder was isolated by filtration, reslurried and isolated twice by solid-liquid centrifugation, and dried. Analytical results are summarized in Table 6.

TABLE 6

| Equil. | | GPC - Malvern method | | | $^1$H-NMR | | |
|---|---|---|---|---|---|---|---|
| | | | | | External | Internal | Total |
| Time (min.) | IV$^a$ (dL/g) | $M_w$ (Da) | $M_n$ (Da) | D | DBA (wt. %) | DBA (wt. %) | DBA (wt. %) |
| 60 | 1.13 | 188,351 | 90,131 | 2.09 | 0.074 | 0.373 | 0.447 |
| 70 | 1.13 | 198,527 | 85,894 | 2.31 | 0.068 | 0.367 | 0.435 |
| 185 | 1.07 | 180,635 | 71,682 | 2.52 | 0.080 | 0.367 | 0.447 |

$^a$Ubbelohde method.

As used herein, "oxygen" refers to molecular oxygen ($O_2$), unless indicated otherwise. The mole ratio of oxygen atoms to monohydric phenol is referred to herein as the "O/monomer mole ratio", i.e. the O/monomer ratio is twice the molecular oxygen ($O_2$)/monomer ratio. "Nitrogen" refers to molecular nitrogen ($N_2$); "monomer" refers to monohydric phenol; "TM" refers to "total monomer", which can be, for example, 2,6-dimethylphenol, 2-methyl-6-phenylphenol, 2,6-diphenylphenol, or combinations thereof. The terms "a" and "an" do not denote a limitation of quantity, but rather the presence of at least one of the referenced items. An asterisk in a chemical structure indicates an open valence.

Recitation of ranges of values are merely intended to serve as a shorthand method of referring individually to each separate value falling within the range, unless otherwise indicated herein, and each separate value is incorporated into this specification as if it were individually recited. Thus each range disclosed herein constitutes a disclosure of any sub-range falling within the disclosed range. Disclosure of a narrower range or more specific group in addition to a broader range or larger group is not a disclaimer of the broader range or larger group. All ranges disclosed herein are inclusive of the endpoints, and the endpoints are independently combinable with each other.

The invention claimed is:

1. A method of making a poly(phenylene ether) having an intrinsic viscosity of 1.2 to 2.0 deciliters per gram, measured in chloroform using an Ubbelohde capillary glass viscometer at 25° C., a polydispersity of 1 to 10, and a unimodal molecular weight distribution comprising:
   in an exotherm period, continuous addition of oxygen and a monohydric phenol of the structure:

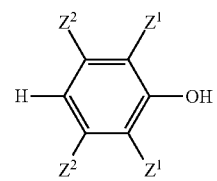

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms, to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.9:1 to 1.2:1; and
   cessation of the continuous addition of the monohydric phenol; and
   in a build period, continuation of oxygen addition until there is no further increase in viscosity of the polymerization mixture.

2. The method of claim 1, wherein the monohydric phenol is 2,6-dimethylphenol and the poly(phenylene ether) is poly(2,6-dimethyl-1,4-phenylene ether).

3. The method of claim 1, wherein the monohydric phenol comprises a first monohydric phenol that is 2,6-dimethylphenol and a second monohydric phenol that is 2-methyl-6-phenylphenol or 2,6-diphenylphenol; and the poly(phenylene ether) is poly(2,6-dimethylphenol-co-2-methyl-6-phenylphenol) or poly(2,6-dimethylphenol-co-2,6-diphenylphenol).

4. The method of claim 1, wherein the weight-average molecular weight of the poly(phenylene ether) is 60,000 to 500,000 daltons, as measured by gel permeation chromatography.

5. The method of claim 1, further comprising, after completion of the exotherm period and build period:
   cessation of oxygen addition;
   flushing oxygen from a gaseous head space above the polymerization mixture;
   addition of a aqueous chelating agent to the polymerization mixture; and
   in an equilibration period, holding the polymerization mixture for 0.1 to 24 hours at 30 to 80° C.

6. The method of claim 5, wherein the monohydric phenol is 2,6-dimethylphenol; the poly(phenylene ether) is poly(2,6-dimethyl-1,4-phenylene ether); and after the equilibration period, the poly(2,6-dimethyl-1,4-phenylene ether) has, based on the total weight of the poly(2,6-dimethyl-1,4-phenylene ether), 0.01 to 2 weight percent of biphenyl units:

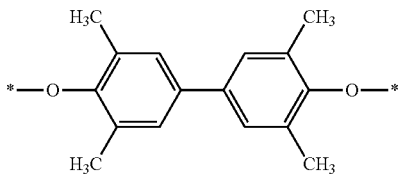 [SMILES: *Oc1c(C)cc(-c2cc(C)c(O*)c(C)c2)cc1C]

derived from 2,2',6,6'-diphenoquinone, as determined by $^1$H-NMR spectroscopy.

7. The method of claim 5, wherein:
the monohydric phenol is 2,6-dimethylphenol;
the amine comprises dibutylamine;
the poly(phenylene ether) is poly(2,6-dimethyl-1,4-phenylene ether); and
after the equilibration period, the poly(2,6-dimethyl-1,4-phenylene ether) has, based on the total weight of the poly(2,6-dimethyl-1,4-phenylene ether), 0.5 to 2.0 weight percent combined of dibutylamino groups covalently bound to internal 2,6-dimethylphenol repeat units as follows:

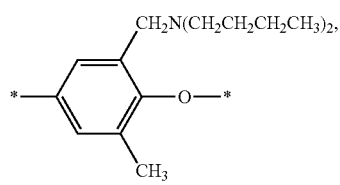

and to terminal 2,6-dimethylphenol units as follows:

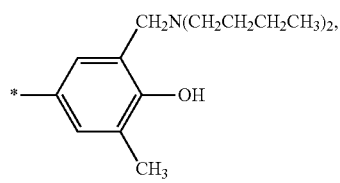

as determined by $^1$H-NMR spectroscopy.

8. The method of claim 1, wherein a second portion of the monohydric phenol is continuously added to a first portion of the monohydric phenol, the non-polar solvent and polymerization catalyst; wherein the first portion comprises 1 to 20 weight percent of the monohydric phenol and the second portion comprises 80 to 99 weight percent of the monohydric phenol.

9. The method of claim 8, wherein the second portion of monohydric phenol is added over a period of 10 to 120 minutes.

10. The method of claim 1, wherein:
the monohydric phenol is 2,6-dimethylphenol;
the poly(phenylene ether) is poly(2,6-dimethyl-1,4-phenylene ether) having an intrinsic viscosity of 1.2 to 1.7 deciliters per gram, measured in chloroform using an Ubbelohde capillary glass viscometer at 25° C., and a polydispersity of 3 to 6;

the mole ratio is 1.0:1 to 1.2:1;
oxidative polymerization comprises continuous addition of a second portion of the monohydric phenol and oxygen to a first portion of the monohydric phenol, the non-polar solvent, and polymerization catalyst;
the first portion comprises 3 to 12 weight percent of the monohydric phenol and the second portion comprises 88 to 97 weight percent of the monohydric phenol and the second portion of the monohydric phenol is added over a period of 20 to 60 minutes.

11. A poly(phenylene ether) having an intrinsic viscosity of 1.2 to 2.0 deciliters per gram, measured in chloroform using an Ubbelohde capillary glass viscometer at 25° C., a polydispersity of 2 to 7, and a unimodal molecular weight distribution, made by a method comprising:
in an exotherm period, continuous addition of oxygen and a monohydric phenol of the structure:

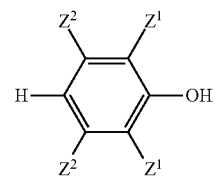

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein two to twelve carbon atoms separate the halogen and oxygen atoms, to a non-polar solvent and a polymerization catalyst comprising a metal salt, an amine, and a quaternary ammonium salt in a vessel, to form a polymerization mixture, wherein the oxygen and monohydric phenol are added in a mole ratio of 0.9:1 to 1.2:1; and
cessation of the continuous addition of the monohydric phenol; and
in a build period, continuation of oxygen addition until there is no further increase in viscosity of the polymerization mixture.

12. The poly(phenylene ether) of claim 11, wherein the monohydric phenol is 2,6-dimethylphenol, and the poly(phenylene ether) is poly(2,6-dimethyl-1,4-phenylene ether).

13. The poly(phenylene ether) of claim 11, wherein the monohydric phenol comprises a first monohydric phenol that is 2,6-dimethylphenol and a second monohydric phenol that is 2-methyl-6-phenylphenol or 2,6-diphenylphenol; and the poly(phenylene ether) is poly(2,6-dimethylphenol-co-2-methyl-6-phenylphenol) or poly(2,6-dimethylphenol-co-2,6-diphenylphenol).

14. The poly(phenylene ether) of claim 11, wherein the weight-average molecular weight of the poly(phenylene ether) is 60,000 to 500,000 daltons, as measured by gel permeation chromatography.

15. The poly(phenylene ether) of claim 11, wherein the method further comprises, after completion of the exotherm period and build period:
    cessation of oxygen addition;
    flushing oxygen from a gaseous head space above the polymerization mixture;
    addition of a aqueous chelating agent to the polymerization mixture; and
    in an equilibration period, holding the polymerization mixture for 0.1 to 24 hours at 30 to 80° C.

16. The poly(phenylene ether) of claim 15, wherein the monohydric phenol is 2,6-dimethylphenol; the poly(phenylene ether) is poly(2,6-dimethyl-1,4-phenylene ether); and after the equilibration period, the poly(phenylene ether) has, based on the total weight of the poly(phenylene ether), 0.01 to 0.08 weight percent of biphenyl units:

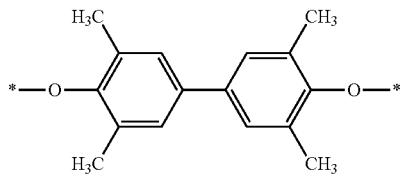 [SMILES: *Oc1c(C)cc(-c2cc(C)c(O*)c(C)c2)cc1C]

derived from 2,2',6,6'-diphenoquinone, as determined by $^1$H-NMR spectroscopy.

17. The poly(phenylene ether) of claim 15, wherein:
    the monohydric phenol is 2,6-dimethylphenol;
    the amine comprises dibutylamine;
    the poly(phenylene ether) comprises poly(2,6-dimethyl-1,4-phenylene ether); and
    after the equilibration period, the poly(2,6-dimethyl-1,4-phenylene ether) has, based on the total weight of the poly(2,6-dimethyl-1,4-phenylene ether), 0.1 to 1.2 weight percent combined of dibutylamino groups covalently bound to internal 2,6-dimethylphenol repeat units as follows:

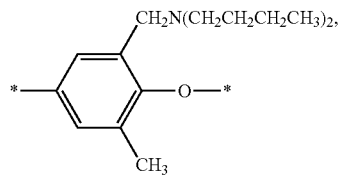

and to terminal 2,6-dimethylphenol units as follows:

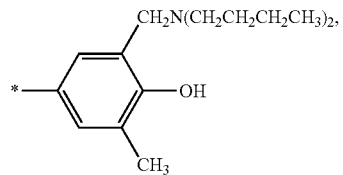

as determined by $^1$H-NMR spectroscopy.

18. The poly(phenylene ether) of claim 11, wherein a second portion of the monohydric phenol is continuously added to a first portion of the monohydric phenol, the non-polar solvent, and polymerization catalyst; wherein the first portion comprises 1 to 20 weight percent of the monohydric phenol and the second portion comprises 80 to 99 weight percent of the monohydric phenol.

19. The poly(phenylene ether) of claim 18, wherein the second portion of monohydric phenol is added over a period of 10 to 120 minutes.

20. The poly(phenylene ether) of claim 11, wherein:
    the monohydric phenol is 2,6-dimethylphenol;
    the poly(phenylene ether) comprises poly(2,6-dimethyl-1,4-phenylene ether) having an intrinsic viscosity of 1.2 to 1.7 deciliters per gram, measured in chloroform using an Ubbelohde capillary glass viscometer at 25° C. and a polydispersity of 3 to 6;
    the oxygen and monohydric phenol are added in a mole ratio of 1.0:1 to 1.2:1;
    oxidative polymerization comprises continuous addition of a second portion of the monohydric phenol and oxygen to a first portion of the monohydric phenol, the non-polar solvent, and polymerization catalyst;
    the first portion comprises 3 to 12 weight percent of the monohydric phenol and the second portion comprises 88 to 97 weight percent of the monohydric phenol; and
    the second portion of the monohydric phenol is added over a period of 30 to 60 minutes.

\* \* \* \* \*